United States Patent
Ushio et al.

(10) Patent No.: US 11,964,916 B2
(45) Date of Patent: Apr. 23, 2024

(54) ZIRCONIA LAYERED BODY

(71) Applicant: TOSOH CORPORATION, Yamaguchi (JP)

(72) Inventors: Yuki Ushio, Yamaguchi (JP); Akiko Ito, Yamaguchi (JP); Sho Azechi, Yamaguchi (JP); Hiroyuki Fujisaki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 18/072,172

(22) Filed: Nov. 30, 2022

(65) Prior Publication Data
US 2023/0108386 A1    Apr. 6, 2023

Related U.S. Application Data

(63) Continuation of application No. 16/801,796, filed on Feb. 26, 2020, now Pat. No. 11,548,825.

(30) Foreign Application Priority Data

Mar. 4, 2019  (JP) .................................. 2019-038234
Mar. 4, 2019  (JP) .................................. 2019-038235

(51) Int. Cl.
C04B 35/488    (2006.01)
C04B 26/06    (2006.01)

(52) U.S. Cl.
CPC .......... C04B 35/4885 (2013.01); C04B 26/06 (2013.01); *C04B 2235/3206* (2013.01);
(Continued)

(58) Field of Classification Search
CPC ................ C04B 35/4885; C04B 26/06; C04B 2235/3206; C04B 2235/3225;
(Continued)

(56) References Cited

U.S. PATENT DOCUMENTS 3,567,017 A ‡ 3/1971 Hughes et al. ....... F04D 29/462
                                                    415/148
RE32,449 E ‡ 6/1987 Claussen ............... C04B 35/486
                                                    264/662
(Continued)

FOREIGN PATENT DOCUMENTS

CN      103058655      4/2013
CN      104844200      8/2015
(Continued)

OTHER PUBLICATIONS

European Search Report dated Jun. 3, 2020 in EP Application No. 20160515.1.
(Continued)

*Primary Examiner* — Bryan D. Ripa
*Assistant Examiner* — Cameron K Miller
(74) *Attorney, Agent, or Firm* — GREENBLUM & BERNSTEIN, P.L.C.

(57) ABSTRACT

A layered body, which has a change in texture derived from zirconia, particularly a change in translucency and is suitable as a dental prosthetic member, a precursor thereof, or a method for producing these. The layered body has a structure in which two or more layers containing zirconia containing a stabilizer are layered, the layered body including at least: a first layer containing zirconia having a stabilizer content of higher than or equal to 4 mol %; and a second layer containing zirconia having a stabilizer content different from that of the zirconia contained in the first layer. At least one layer contains one or more elements capable of coloring zirconia.

19 Claims, 2 Drawing Sheets

(52) U.S. Cl.
CPC ............... *C04B 2235/3225* (2013.01); *C04B 2235/3229* (2013.01); *C04B 2235/602* (2013.01); *C04B 2235/608* (2013.01); *C04B 2235/66* (2013.01); *C04B 2235/77* (2013.01); *C04B 2235/9653* (2013.01); *C04B 2237/343* (2013.01); *C04B 2237/348* (2013.01); *C04B 2237/525* (2013.01)

(58) Field of Classification Search
CPC ...... C04B 2235/3229; C04B 2235/602; C04B 2235/608; C04B 2235/66; C04B 2235/77; C04B 2235/9653; C04B 2237/343; C04B 2237/348; C04B 2237/525
See application file for complete search history.

(56) References Cited

U.S. PATENT DOCUMENTS

| | | | |
|---|---|---|---|
| 11,542,201 B2 * | 1/2023 | Ushio | B32B 18/00 |
| 11,548,825 B2 * | 1/2023 | Ushio | C04B 35/486 |
| 2013/0221554 A1 ‡ | 8/2013 | Jung | B32B 18/00 264/16 |
| 2016/0120765 A1 ‡ | 5/2016 | Dang | A61K 6/822 428/218 |
| 2016/0208668 A1 ‡ | 12/2016 | Matsumoto | F01N 3/208 |
| 2016/0354186 A1 ‡ | 12/2016 | Kim | C04B 35/48 |
| 2018/0148378 A1 ‡ | 5/2018 | Mayr | B33Y 10/00 |
| 2018/0115529 A1 ‡ | 6/2018 | Munger | H04L 63/0227 |
| 2018/0221118 A1 ‡ | 8/2018 | Jahns | A61K 6/82 |
| 2019/0231494 A1 * | 8/2019 | Dittmann | C04B 38/0054 |
| 2019/0380815 A1 ‡ | 12/2019 | Aiba | A61K 6/16 |
| 2019/0381769 A1 ‡ | 12/2019 | Reinshagen | C04B 35/645 |

FOREIGN PATENT DOCUMENTS

| | | |
|---|---|---|
| CN | 107 842 569 | 3/2018 |
| CN | 107 842 569 A ‡ | 3/2018 |
| CN | 108358627 | 8/2018 |
| EP | 3 567 017 | 11/2019 |
| JP | 2005-239468 | 9/2005 |
| JP | 2014-218389 ‡ | 11/2014 |
| JP | 2016-527017 ‡ | 9/2016 |
| WO | 2016/208668 | 12/2016 |
| WO | 2018/115529 | 6/2018 |

OTHER PUBLICATIONS

Third Party Observation issued by EPO for European Patent Application No. 20200160515 dated Jul. 25, 2022.
Tosoh Zirconia Powder—Specification and Typical Properties—Grades: TZ-3Y,3YS. 3YB, 3YSB Mar. 2003 (Tosoh).
Tosoh Zirconia Powder—Specification and Typical Properties—Grades: TZ-3Y-E, 3YS-E, 3YB-E, 3YSB-E, 3YSB-C, Aug. 2004 (Tosoh).
"Powder for translucent zirconia sintered body suitable for dental materials "ZpeX"". Nanyo Laboratory Electrical and Inorganic Chemistry G, Tokyo Research Laboratory Ceramics Field Ceramics G, p. 57-61, 2012.
""Zpex® Smile" with enhanced coloring grade and translucency of dental zirconia "Zpex®"", Inorganic Materials Laboratory, Ceramics Group, p. 43-47, 2014.
Office Action issued in Chinese Patent Application No. 202010122777.0 dated Jul. 13, 2022, along with English translation thereof.
Communication issued Oct. 16, 2023 from EPO Reporting Third Party Observation in corresponding European family member application No. 20160515.1.
Office Letter accompanying Communication issued Oct. 16, 2023 from EPO Reporting Third Party Observation in corresponding European family member application No. 20160515.1.

* cited by examiner
‡ imported from a related application

ZIRCONIA LAYERED BODY

CROSS-REFERENCE TO RELATED APPLICATIONS

This is a Continuation of U.S. application Ser. No. 16/801,796, filed Feb. 26, 2020, which claims the benefit of Japanese Application Nos. 2019-038234 and 2019-038235, both filed Mar. 4, 2019. The disclosure of each of these documents is hereby incorporated herein by reference in its entirety.

BACKGROUND OF THE INVENTION

Field of the Invention

The present disclosure relates to a composition in which layers of zirconia are layered and to a zirconia layered body.

Description of Related Art

A zirconia ($ZrO_2$) sintered body is produced by molding raw material powder which mainly contains zirconia and sintering the molded raw material powder. The raw material powder thermally shrinks and is densified through heat treatment such as sintering or calcination. The behavior of the raw material powder during heat treatment differs depending on the characteristics of the raw material powder, particularly the composition of the raw material powder.

The majority of raw material powder is zirconia. Nevertheless, the thermal shrinkage behaviors of both kinds of raw material powder are greatly different from each other even if there is only a difference in the content of additives of less than 0.1 wt %. In a case where a green body in which raw material powder having such a small difference in composition are layered is subjected to a heat treatment, failures such as peeling of a part of a layer or generation of distortion may occur. The above-described failures occur even in a case where an additive is added to identical zirconia compounds. In order to subject a green body to a heat treatment without causing these failures, special adjustment or treatment is required (for example, Patent Documents 1 and 2).

Patent Document 1 discloses that compositions and thermal shrinkage behaviors of raw material powder are adjusted by coating the raw material powder with a dopant, and the raw material powder are molded to obtain a sintered body consisting of a layered body having different color tones without distortion. In addition, Patent Document 2 discloses that a sintered body, which consists of a layered body having a change in color tone and layers having different contents of colorants, is obtained by layering and molding layers by applying vibration so as to form a boundary layer in which powder of upper and lower layers are mixed with each other.

PATENT DOCUMENTS

[Patent Document 1] Published Japanese Translation No. 2016-527017 of the PCT International Publication
[Patent Document 2] Japanese Unexamined Patent Application, First Publication No. 2014-218389

SUMMARY OF THE INVENTION

In the layered bodies disclosed in Patent Documents 1 and 2, the difference in the content of additives between the layers is less than 0.5 wt % at a maximum, which is merely a small composition difference. Furthermore, zirconia compounds accounting for the majority of raw material powder have the same compositions. Therefore, these layered bodies have the same texture mainly derived from the translucency of zirconia. For this reason, these layered bodies have a different texture compared to natural teeth having a texture derived from a change in translucency.

An object of the present disclosure is to provide at least any of a layered body, which has a change in texture derived from zirconia, particularly a change in translucency and is suitable as a dental prosthetic member, a precursor thereof, or a method for producing these.

The present inventors have focused on a green body before a heat treatment, that is, a state of raw material powder after molding. As a result, it is confirmed that states of distortion occurring at a point in time of molding are greatly different between a green body in which raw material powder having different contents of stabilizers of zirconia are layered and a green body in which raw material powder differing only in the content of additives are layered. In addition, they have confirmed that such distortion has a great influence on the state of a calcined body or a sintered body after a heat treatment. Furthermore, it is found that the above-described failures are unlikely to occur when controlling the state of a green body even if a layered body in which raw material powder having different contents of stabilizers of zirconia are layered is subjected to a heat treatment.

That is, the gist of the present disclosure is as follows.

[1] A layered body having a structure in which two or more layers containing zirconia containing a stabilizer are layered, the layered body including at least: a first layer containing zirconia having a stabilizer content of higher than or equal to 4 mol %; and a second layer containing zirconia having a stabilizer content different from that of the zirconia contained in the first layer.

[2] The layered body according to [1], in which the content of the stabilizer of the stabilizer-containing zirconia contained in the second layer is 1.5 mol % to 7.0 mol %.

[3] The layered body according to [1] or [2], in which the content of the stabilizer of the stabilizer-containing zirconia contained in the second layer is 5.0 mol % to 7.0 mol %.

[4] The layered body according to any one of [1] to [3], in which the content of the stabilizer of the stabilizer-containing zirconia contained in the first layer is 4.0 mol % to 6.0 mol %.

[5] The layered body according to any one of [1] to [4], in which a difference between the stabilizer content in the first layer and the stabilizer content in the second layer is greater than or equal to 0.2 mol %.

[6] The layered body according to any one of [1] to [5], in which the stabilizer is one or more selected from the group consisting of yttria ($Y_2O_3$), calcia (CaO), magnesia (MgO), and ceria ($CeO_2$).

[7] The layered body according to any one of [1] to [6], in which at least one of the layers contains alumina.

[8] The layered body according to any one of [1] to [7], in which a warp measured using a thickness gauge according to JIS B 7524:2008 is less than or equal to 1.0 mm.

[9] The layered body according to any one of [1] to [8], in which a warp measured using a thickness gauge according to JIS B 7524:2008 is less than or equal to 0.2 mm.

The layered body according to any one of [1] to [9], in which the layered body is a sintered body.

[11] The layered body according to [10], in which a density measured through a method according to JIS R 1634 is 5.7 $g/cm^3$ to 6.3 $g/cm^3$.

[12] The layered body according to [10] or [11] further including: a zirconia layer of which a total light transmittance with respect to light having a wavelength of 600 nm at a sample thickness of 1.0 mm is 30% to 50%.

[13] The layered body according to any one of [1] to [9], in which the layered body is a calcined body.

[14] The layered body according to [13], in which a density is 2.4 g/cm$^3$ to 3.7 g/cm$^3$.

[15] A method for producing the layered body according to any one of [1] to [12], including: a step of sintering a green body at 1,200° C. to 1,600° C., wherein the green body has a structure, in which two or more powder composition layers consisting of a powder composition containing stabilizer-containing zirconia and a binding agent are layered, includes at least a first powder composition layer containing a binding agent and zirconia which has a stabilizer content of higher than or equal to 4 mol % and a second powder composition layer containing a binding agent and zirconia which has a stabilizer content different from that of the zirconia contained in the first powder composition layer, and has a difference in a binder content between the first powder composition layer and the second powder composition layer exceeds 0.01 wt %.

[16] A method for producing the layered body according to any one of [1] to [12], the method including: a step of calcining a green body at a temperature of higher than or equal to 800° C. and lower than 1,200° C. to obtain a calcined body; and a step of sintering the calcined body at 1,200° C. to 1,600° C., wherein the green body has a structure, in which two or more powder composition layers consisting of a powder composition containing stabilizer-containing zirconia and a binding agent are layered, includes at least a first powder composition layer containing a binding agent and zirconia which has a stabilizer content of higher than or equal to 4 mol % and a second powder composition layer containing a binding agent and zirconia which has a stabilizer content different from that of the zirconia contained in the first powder composition layer, and has a difference in a binding agent content between the first powder composition layer and the second powder composition layer exceeds 0.01 wt %.

[17] A method for producing the layered body according to any one of [1] to [9], [13], and [14] including: a step of calcining a green body at a temperature of higher than or equal to 800° C. and lower than 1,200° C., wherein the green body has a structure, in which two or more powder composition layers consisting of a powder composition containing stabilizer-containing zirconia and a binding agent are layered, includes at least a first powder composition layer containing a binding agent and zirconia which has a stabilizer content of higher than or equal to 4 mol % and a second powder composition layer containing a binding agent and zirconia which has a stabilizer content different from that of the zirconia contained in the first powder composition layer, and has a difference in a binding agent content between the first powder composition layer and the second powder composition layer exceeds 0.01 wt %.

[18] The production method according to any one of [15] to [17], in which a warp of the green body measured using a thickness gauge according to JIS B 7524:2008 is less than or equal to 1.0 mm.

[19] The production method according to any one of [15] to [18], in which the binding agent is one or more selected from the group consisting of polyvinyl alcohol, polyvinyl butyrate, wax, and acrylic resin.

[20] The production method according to any one of [15] to [19], in which the powder composition contained in the powder composition layers is granulated powder.

[21] The production method according to any one of [15] to [20], in which a density of the green body is 2.4 g/cm$^3$ to 3.7 g/cm$^3$.

[22] A dental material containing the layered body according to any one of [1] to [14].

According to the present disclosure, it is possible to provide any of a layered body, which has a change in texture derived from zirconia, particularly a change in translucency and is suitable as a dental prosthetic member, a precursor thereof, or a method for producing these.

DETAILED DESCRIPTION OF THE INVENTION

A layered body of the present embodiment may be one or more selected from the group consisting of a sintered body, a calcined body, and a green body, and is preferably at least any of a sintered body or a calcined body. Here, in the present embodiment, a "layer containing zirconia containing a stabilizer" may be regarded as a "zirconia layer containing zirconia containing a stabilizer" in a case where the layered body is a sintered body, a "zirconia composition layer containing zirconia which contains a stabilizer and has a necking structure" in a case where the layered body is a calcined body, and a "powder composition layer consisting of a powder composition containing stabilizer-containing zirconia and a binding agent" in a case where the layered body is a green body.

Hereinafter, the layered body of the present disclosure will be described with reference to an example of an embodiment in which the layered body is a sintered body.

In the present embodiment, the layered body is a sintered body which has a structure, in which two or more zirconia layers containing zirconia containing a stabilizer are layered, and includes at least: a first zirconia layer containing zirconia having a stabilizer content of greater than or equal to 4 mol %; and a second zirconia layer containing zirconia having a stabilizer content different from that of the zirconia contained in the first zirconia layer.

The sintered body of the present embodiment is a so-called layered body which is a composition having a multilayer structure, and is a layered body consisting of a sintered structure. In the present embodiment, the sintered structure is a structure made of zirconia in a later stage of sintering.

The sintered body of the present embodiment has a zirconia layer which contains zirconia containing a stabilizer (hereinafter, also simply referred to as a "zirconia layer"). The zirconia layer consists of crystal grains of zirconia containing a stabilizer. Accordingly, the sintered body of the present embodiment can also be regarded as a layered body including two or more layers containing zirconia consisting of zirconia crystal grains containing a stabilizer.

Figure 1:
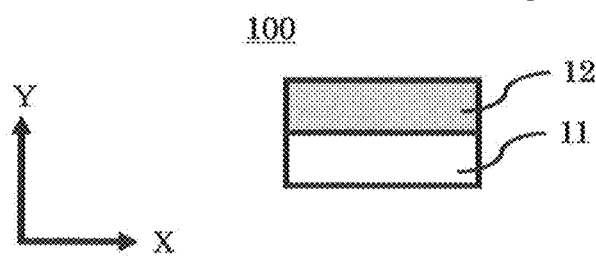
FIG. 1 is a schematic diagram showing a cross section of a sintered body having a structure in which two zirconia layers are layered.

FIG. 1 is a schematic diagram which shows an example of a structure of the sintered body of the present embodiment and schematically shows a cross section of a sintered body (100) having a structure in which two zirconia layers containing zirconia containing a stabilizer are layered. In FIG. 1, a direction in which layers are piled up is indicated as a Y-axis direction (hereinafter, also referred to as a "layering direction"), and a direction in which each layer spreads is indicated as an X-axis direction (hereinafter, also referred to as a "horizontal direction").

The sintered body (100) includes zirconia layers which are a first zirconia layer (hereinafter, also referred to as a "first layer") (11) containing zirconia having a stabilizer content of greater than or equal to 4 mol % and a second zirconia layer (hereinafter, also referred to as a "second layer") (12) containing zirconia having a stabilizer content different from that of the zirconia contained in the first zirconia layer. The sintered body (100) is shown as a sintered body having a structure in which the first layer (11) and the second layer (12) are layered adjacent to each other. In the case where the sintered body has a structure in which zirconia layers containing zirconia having different stabilizer contents are layered, the sintered body becomes a layered body in which a change in texture, particularly a change in translucency can be visually recognized. A state in which the first layer comes into contact with the second layer via an interface is shown in the sintered body (100). However, the layers of the sintered body of the present embodiment may be layered in a state in which there is no visually recognizable interface, and the interface between layers is not limited to being linear.

In the sintered body (100), the first layer and the second layer have substantially the same thickness. However, in the sintered body of the present embodiment, each layer may have a different thickness (hereinafter, also referred to as a "layer thickness"), and the layer thickness of either the first layer or the second layer may be thicker. For example, the layer thicknesses of the first layer and the second layer may satisfy the following relation, and the layer thickness of a zirconia layer having a high stabilizer content is thicker than that of a zirconia layer having a low stabilizer content. Examples of the layer thickness include 1 mm to 20 mm, 2 mm to 15 mm, and 3 mm to 10 mm.

$$D_{high} \geq D_{low}, \text{ preferably } 2 \times D_{low} \geq D_{high} \geq D_{low}$$

Where $D_{high}$ is a layer thickness of a zirconia layer having a high stabilizer content, and $D_{low}$ is a layer thickness of a zirconia layer having a low stabilizer content.

The shape of the sintered body of the present embodiment is arbitrary, and may be at least one selected from the group consisting of a spherical shape, an elliptical shape, a disk shape, a cylindrical shape, a cubic shape, a rectangular parallelepiped shape, and a polyhedral shape, or may be a shape suitable for dental materials including dental prosthetic materials such as a crown, a bridge, and an onlay, or an arbitrary shape according to other intended uses. In the present embodiment, the spherical shape may include a shape similar to a true sphere such as a substantially spherical shape in addition to a true sphere, and a polyhedral shape may include a shape similar to a polyhedron such as a substantially polyhedral shape in addition to a polyhedron.

The dimensions of the sintered body of the present embodiment are arbitrary, and examples thereof include 10 mm to 120 mm in length, 12 mm to 120 mm in width, and 6 mm to 40 mm in height. In addition, the thickness of the sintered body of the present embodiment in the layering direction, that is, the height of the sintered body is arbitrary, and examples thereof include 4 mm to 40 mm and 5 mm to 30 mm.

The sintered body of the present embodiment is preferably in a state in which the first layer and the second layer are layered adjacent to each other. In addition, the first layer and the second layer are each preferably positioned as a lowest layer (hereinafter, also referred to as a "lowermost layer") in the layering direction or as a topmost layer (hereinafter, also referred to as an "uppermost layer") in the layering direction. It is preferable that one of the first layer and the second layer be positioned as a lowermost layer and the other one of the first layer and the second layer be positioned as an uppermost layer.

The sintered body of the present embodiment may have a structure in which two or more zirconia layers containing zirconia containing a stabilizer are layered, or may have a structure in which three or more zirconia layers, or four or more zirconia layers are layered. The sintered body becomes a layered body in which a small change in texture can be visually recognized according to increase in the number of layers. In a case where the same texture as that of natural teeth is required, the sintered body of the present embodiment may have a structure in which 2 to 10 zirconia layers, 2 to 5 zirconia layers, or 2 to 4 zirconia layers are layered, for example.

A zirconia layer other than the first layer and the second layer (hereinafter, also referred to as a "optional layer") may be a zirconia layer containing zirconia having a stabilizer content of higher than or equal to a minimum value and lower than or equal to a maximum value of the contents of the stabilizers of zirconia contained in the first layer and the second layer. The sintered body of the present embodiment may contain a plurality of optional layers.

Although the layering order of the optional layers is arbitrary, a structure is preferable in which the optional layers are interposed between the first layer and the second layer. In the case where the sintered body of the present embodiment includes a plurality of optional layers (an optional layer in a single layer is also referred to as a "third layer", optional layers in double or multiple layers are also referred to as a "fourth layer", a "fifth layer", and the like), the sintered body preferably has a structure in which the zirconia layers are layered so that the change in the contents of the stabilizers in the layering direction becomes constant, that is, the change increases (or decreases). The structure in which the optional layers are interposed between the first layer and the second layer in the present embodiment is a structure in which the optional layer is positioned between the first layer and the second layer in the layering direction, and is not limited to a structure in which the optional layers are layered directly adjacent to both the first layer and the second layer. In addition, the ordinal numbers such as first, second, and third in the present embodiment are numbers given for convenience of description, and do not mean a layered state or a permutation such as a layering order.

Figure 2:
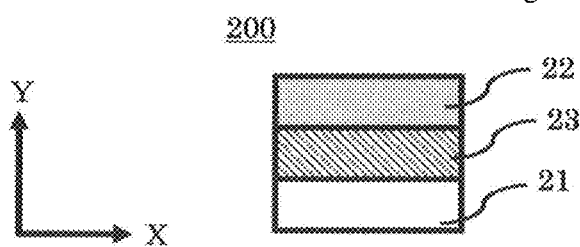
FIG. 2 is a schematic diagram showing a cross section of a sintered body having a structure in which three zirconia layers are layered.

FIG. 2 is a schematic diagram which shows another example of a structure of the sintered body of the present embodiment and shows a cross section of a sintered body (200) having a structure in which three zirconia layers are layered. The sintered body (200) has a structure in which a third layer (23) is layered in addition to a first layer (21) and a second layer (22) and the third layer (23) is interposed between the first layer (21) and the second layer (22).

In a case where the sintered body includes a plurality of zirconia layers such as the fourth layer and the fifth layer, the sintered body preferably has a structure in which the zirconia layers are layered so that the contents of stabilizers change constantly in the layering direction. Accordingly, a translucent gradation can be formed in the layering direction.

In the sintered body of the present embodiment, a warp (hereinafter, also simply referred to as a "warp") measured using a thickness gauge according to JIS B 7524:2008 is less than or equal to 1.0 mm. A sintered body having a structure with two or more zirconia layers has a shape warped in the layering direction (or a direction opposite to the layering direction) through sintering. In a case where such a sintered body is disposed on a horizontal plate, a gap is formed between the sintered body and the horizontal plate.

The warp in the present embodiment is a value measured using a thickness gauge (hereinafter, also simply referred to as a "gauge") according to JIS B 7524:2008. The warp of the sintered body of the present embodiment is preferably less than or equal to 0.3 mm, more preferably less than or equal to 0.2 mm, still more preferably less than or equal to 0.1 mm, and still more preferably less than or equal to 0.05 mm. The sintered body preferably does not have a warp (warp of 0 mm), but the sintered body of the present embodiment may have a warp (warp of greater than or equal to 0 mm) to a degree that cannot be measured by a gauge. The sintered body of the present embodiment has, for example, a warp greater than 0 mm or greater than or equal to 0.01 mm. It is preferable that the warp be less than or equal to 0.06 mm, less than or equal to 0.05 mm, or less than or equal to a measurement limit (less than 0.03 mm).

Figure 3:
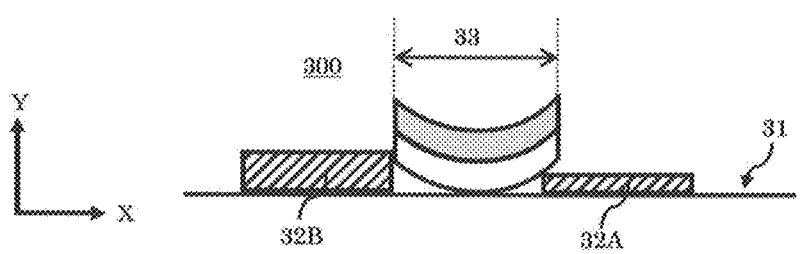
FIG. 3 is a schematic diagram showing a method for measuring a warp.

The warp can be measured using a maximum value of the thickness of a gauge that can be inserted into a gap formed in a state in which a sintered body is disposed so that a convex portion of the sintered body comes into contact with a horizontal plate. FIG. 3 is a schematic diagram showing a method for measuring a warp. A sintered body (300) shows a cross section of a disk-shaped sample and shows a sintered body warped in the layering direction (Y-axis direction). In FIG. 3, the warp of the sintered body (300) is emphasized for explanation. When measuring the warp, the sintered body (300) with a concave-convex shape is disposed so that the convex portion of the sintered body comes into contact with a horizontal plate (31) as shown in FIG. 3. Accordingly, a gap is formed between the horizontal plate (31) and a surface (hereinafter, also referred to as a "bottom surface") on which the sintered body (300) comes into contact with the horizontal plate (31). The warp can be measured by inserting a gauge into the gap and using a maximum value of the thickness of the gauge that can be inserted. FIG. 3 shows a state in which a gauge (32A) is positioned under the bottom surface of the sintered body (300) and can be inserted into the gap. On the other hand, FIG. 3 shows a state in which a gauge (32B) is not positioned under the bottom surface of the sintered body (300) and cannot be inserted into the gap. The gauges (32A) and (32B) in FIG. 3 are gauges having different thicknesses by one step (for example, 0.01 mm), and the warp of the sintered body (300) becomes the thickness of the gauge (32A). In order to simplify the description, FIG. 3 shows a diagram in which both the gauges (32A) and (32B) are inserted into the gap. However, the warp may be measured by inserting gauges sequentially from a thin gauge (for example, the warp is measured using the gauge (32A) which is then removed, and the warp is subsequently measured using the thicker gauge (32B)).

In the sintered body of the present embodiment, the warp (hereinafter, also referred to as a "deformation amount") with respect to the dimension of the sintered body is preferably less than or equal to 1.0, more preferably less than or equal to 0.5, still more preferably less than or equal to 0.2, and still more preferably less than or equal to 0.15. The deformation amount is, for example, greater than or equal to 0, greater than or equal to 0.01, or greater than or equal to 0.05.

The deformation amount can be obtained from the following equation.

$$\text{Deformation amount} = (\text{warp: mm})/(\text{dimension of sintered body: mm}) \times 100$$

The dimension of the sintered body is a size of the sintered body in a direction perpendicular to the direction of the warp. The sintered body (300) of FIG. 3 is warped in the layering direction (Y-axis direction). Therefore, the dimension of the sintered body (300) is corresponding to a size (33) of the sintered body in the horizontal direction (X-axis direction) perpendicular to the layering direction. The dimension can be measured through a well-known measurement method using calipers, a micrometer, and the like. For example, in a case of a disk-shaped or cylindrical layered body, diameters of upper ends and diameters of lower ends at four points are measured using calipers, and an average value of the diameters of the upper ends and the lower ends is obtained to obtain the dimension of the layered body using the average value of the obtained values.

In the present embodiment, the warp and the deformation amount are preferably values measured using a disk-shaped sample as a measurement sample and more preferably values measured using a disk-shaped sample having a diameter of 5 mm to 120 mm as a measurement sample.

The sintered body of the present embodiment is comprising to zirconia layers containing zirconia containing a stabilizer. The zirconia layer is a layer containing zirconia as a main component, and the zirconia is a zirconia containing a stabilizer (hereinafter, also referred to as "stabilizer-containing zirconia"). The sintered body and the zirconia layer of the present embodiment may contain not only stabilizer-containing zirconia but also unavoidable impurities such as hafnia ($HfO_2$), but preferably do not contain other impurities than the unavoidable impurities. Examples of impurities include silica ($SiO_2$) or titania ($TiO_2$). For example, the sintered body of the present embodiment does not substantially contain silica or titania.

In the sintered body of the present embodiment, the zirconia is preferably zirconia in a state in which zirconia obtained by subjecting a zirconia sol to a heat treatment is sintered, more preferably zirconia in a state in which zirconia obtained by subjecting a zirconia sol obtained by hydrolyzing a zirconium compound to a heat treatment is sintered, and still more preferably zirconia in a state in which zirconia obtained by subjecting a zirconia sol obtained by hydrolyzing zirconium oxychloride to a heat treatment is sintered.

Examples of zirconia contained in a zirconia layer include sintered zirconia, that is, zirconia crystal grains.

A stabilizer may have a function of suppressing phase transition of zirconia. The stabilizer is preferably one or more selected from the group consisting of yttria ($Y_2O_3$), calcia (CaO), magnesia (MgO), and ceria ($CeO_2$) and more preferably yttria. The stabilizer is in a state of being contained and doped (solid-soluted) in zirconia. In addition, the sintered body of the present embodiment preferably does not contain an undoped stabilizer, that is, a stabilizer not doped in zirconia. In the present embodiment, the expression "not containing an undoped stabilizer" means that no XRD peaks derived from a stabilizer can be confirmed in XRD measurement and XRD pattern analysis to be described below. Incorporation of an undoped stabilizer is acceptable as long as no XRD peak derived from the stabilizer can be confirmed.

The content (hereinafter, also referred to as a "stabilizer content of a first layer") of a stabilizer of stabilizer-containing zirconia contained in a first layer is higher than or equal to 4 mol %, preferably higher than or equal to 4.1 mol %, and more preferably higher than or equal to 4.2 mol %. The stabilizer content of the first layer is, for example, lower than or equal to 6.0 mol %, lower than or equal to 5.8 mol %, lower than or equal to 5.5 mol %, or lower than or equal to 5.0 mol %. The stabilizer content of the first layer is, for example, 4 mol % to 6.0 mol %, or higher than or equal to 4 mol % and lower than 5.0 mol %.

The content (hereinafter, also referred to as a "stabilizer content of a second layer") of a stabilizer of stabilizer-containing zirconia contained in a second layer may be different from the stabilizer content of the first layer, but is preferably higher than that of the first layer. That is, the sintered body of the present embodiment preferably does not contain a zirconia layer in which the content of a stabilizer of zirconia is lower than 4 mol %. Accordingly, a sintered body exhibiting translucency closer to that of natural teeth is easily obtained.

The stabilizer content of the second layer may be higher than or equal to 1.5 mol %, higher than or equal to 2.0 mol %, or higher than or equal to 3.0 mol %, and is preferably higher than or equal to 4.0 mol %, more preferably higher than 4.0 mol %, still more preferably higher than or equal to 4.5 mol %, still more preferably higher than or equal to 5.0 mol %, and still more preferably higher than 5.0 mol %. In addition, the stabilizer content of the second layer is, for example, lower than or equal to 7.0 mol %, lower than or equal to 6.5 mol %, lower than or equal to 6.0 mol %, or lower than or equal to 5.8 mol %. In the case where the first layer and the second layer have different contents of stabilizers and the stabilizer contents of both the layers are within these ranges, the sintered body is likely to exhibit a texture that can be visually recognized as a texture close to that of natural teeth. The stabilizer content of the second layer is, for example, 1.5 mol % to 7.0 mol %, 3.0 mol % to 6.5 mol %, 5.0 mol % to 6.5 mol %, or higher than 5.0 mol % and lower than or equal to 6.5 mol %.

The sintered body of the present embodiment preferably includes at least a first zirconia layer and a zirconia layer containing zirconia having a stabilizer content of higher than or equal to 5 mol % and more preferably includes a first zirconia layer and a zirconia layer containing zirconia having a stabilizer content of higher than 5 mol %. As another embodiment, the sintered body of the present embodiment more preferably has a stabilizer content of a first layer of 4.0 mol % to 5.1 mol % and a stabilizer content of a second layer of 4.5 mol % to 6.0 mol % and still more preferably has a stabilizer content of a first layer of 4.0 mol % to 5.0 mol % and a stabilizer content of a second layer of higher than 5.0 mol % and lower than or equal to 6.0 mol %.

The content (hereinafter, also referred to as a "stabilizer content of an optional layer") of a stabilizer of stabilizer-containing zirconia contained in an optional layer is higher than or equal to a minimum value and lower than or equal to a maximum value of the contents of the stabilizers of the zirconia contained in the first layer and the second layer, and is preferably higher than a minimum value and lower than a maximum value of the contents of the stabilizers of the zirconia contained in the first layer and the second layer. The stabilizer content of the optional layer is, for example, 1.5 mol % to 7.0 mol %, 3.0 mol % to 6.5 mol %, or 4.0 mol % to 6.0 mol %. In a case where the content of the stabilizer of the zirconia contained in the first layer is 4.0 mol % and the content of the stabilizer of the zirconia contained in the second layer is 6.0 mol %, the content of the stabilizer of the zirconia of the optional layer is, for example, 4.0 mol % to 6.0 mol % and preferably higher than 4.0 mol % and less than 6.0 mol %. In a case where the stabilizer content of the optional layer is the same as that of the first layer or the second layer, a zirconia layer which has the same stabilizer content as the optional layer and is positioned as the uppermost layer or the lowermost layer may be regarded as the first layer or the second layer.

The difference between the stabilizer content of the first layer and the stabilizer content of the second layer is preferably greater than or equal to 0.2 mol %, more preferably greater than or equal to 0.5 mol %, still more preferably greater than or equal to 0.7 mol %, still more preferably greater than or equal to 1.0 mol %, and still more preferably greater than or equal to 1.2 mol %. As the difference in the stabilizer content increases, the difference in translucency between the zirconia layers tends to increase, and in contrast, the warp sometimes increases. In a case where the difference between the stabilizer content of the first layer and the stabilizer content of the second layer is less than 2.5 mol % or less than or equal to 2.0 mol %, the sintered body is tended to have the same translucency as that of natural teeth. It is more preferable that the difference between the stabilizer content of the first layer and the stabilizer content of the second layer be greater than or equal to 0.7 mol % and less than 2.5 mol % and the warp be less than or equal to 0.5 mm.

The sintered body of the present embodiment preferably has a structure in which the difference in the stabilizer content between zirconia layers layered adjacent to each other is 0.5 mol % to 3.0 mol %, 1.0 mol % to 2.5 mol %, or 1.2 mol % to 2.0 mol %.

The stabilizer content (stabilizer content as the entirety of the sintered body) of the sintered body of the present embodiment is arbitrary, but examples thereof include higher than 1.5 mol % and lower than 7.0 mol %, 2.5 mol % to 6.5 mol %, 3.0 mol % to 6.0 mol %, or 3.5 mol % to 5.8 mol %, and is preferably 4.1 mol % to 5.5 mol % and more preferably 4.7 mol % to 5.3 mol %. The stabilizer content of a sintered body is obtained from the following formula and varies depending on the thickness of each zirconia layer.

Stabilizer content of sintered body=(layer thickness of first layer/height of sintered body)×stabilizer content of first layer+(layer thickness of second layer/height of sintered body)×stabilizer content of second layer+ . . . +(layer thickness of $n$-th layer/height of sintered body)×stabilizer content of $n$-th layer The stabilizer content of a first layer is higher than or equal to 4 mol %. Therefore, in a case where the stabilizer content of a second layer is, for example, higher than 4.0 mol %, the stabilizer content of a sintered body, including two zirconia layers having the same layer thickness, exceeds 4.0 mol %.

In the sintered body of the present embodiment, it is preferable that the stabilizer content of a first layer be 4.0 mol % to 5.0 mol %, the stabilizer content of a second layer be higher than 5.0 mol % and lower than or equal to 6.0 mol %, and the difference between the stabilizer content of the first layer and the stabilizer content of the second layer be 0.7 mol % to 1.8 mol %, and it is more preferable that the yttria content of a first layer be 4.0 mol % to 5.0 mol %, the yttria content of a second layer be higher than 5.0 mol % and lower than or equal to 6.0 mol %, and the difference between the yttria content of the first layer and the yttria content of the second layer be 0.7 mol % to 1.8 mol %.

The stabilizer content in the present embodiment is a molar ratio of a stabilizer to the total amount of zirconia and a stabilizer and can be obtained by $\{Y_2O_3/(ZrO_2+Y_2O_3)\} \times 100$ (mol %) in a case where the stabilizer is yttria ($Y_2O_3$).

The sintered body of the present embodiment may contain alumina, and at least one zirconia layer preferably contains alumina. The alumina content of the sintered body of the present embodiment may be, as a ratio of the weight of alumina to the weight of the sintered body, for example, higher than or equal to 0 wt %, 0 wt % to 0.15 wt %, 0 wt % to 0.10 wt %, or 0 wt % to 0.07 wt %. In the case where alumina is contained, the alumina content is, for example, higher than 0 wt % and lower than or equal to 0.15 wt %, preferably 0.005 wt % to 0.10 wt %, and more preferably 0.01 wt % to 0.70 wt %.

The alumina content of each zirconia layer is, for example, within the same range as described above. In some cases, the alumina content of each zirconia layer affects a thermal shrinkage behavior in a calcination stage. The alumina content of each zirconia layer is arbitrary. Each zirconia layer may have a different alumina content, but they preferably have the same alumina content. In the case where zirconia layers have a different alumina content, the difference in the alumina content of adjacent zirconia layers is, for example, higher than 0 wt % and lower than or equal to 1.0 wt %, greater than 0 wt % and lower than or equal to 0.5 wt %, greater than 0 wt % and lower than or equal to 0.03 wt %, or 0.005 wt % to 0.01 wt %. In a case of a zirconia layer made of zirconia which contains alumina ($Al_2O_3$) and of which a stabilizer is yttria ($Y_2O_3$), the alumina content can be obtained by $\{Al_2O_3/(ZrO_2+Y_2O_3+Al_2O_3)\} \times 100$ (wt %).

The sintered body and each zirconia layer of the present embodiment may not contain a color pigment. On the other hand, the sintered body of the present embodiment may contain an element (hereinafter, also referred to as a "color pigment") having a function of coloring zirconia in order to obtain arbitrary coloration. The color pigment may be an element having a function of coloring zirconia. Furthermore, the color pigment may be an element which has a function of coloring zirconia and a function of suppressing phase transition. Specific examples of the color pigment include at least any of a transition metal element or a lanthanoid-based rare earth element, and are preferably one or more selected from the group consisting of iron (Fe), cobalt (Co), nickel (Ni), manganese (Mn), praseodymium (Pr), neodymium (Nd), europium (Eu), gadolinium (Gd), terbium (Tb), erbium (Er), and ytterbium (Yb), more preferably one or more selected from the group consisting of iron, cobalt, manganese, praseodymium, gadolinium, terbium, and erbium, and still more preferably one or more selected from the group consisting of iron, cobalt, and erbium.

The content of the color pigment is, as a mass ratio of each color pigment in terms of an oxide with respect to the mass of each zirconia layer, 0 wt % to 0.3 wt % and preferably 0 wt % to 0.2 wt %, for example.

The state of the color pigment contained in the sintered body of the present embodiment is arbitrary and is, for example, at least any of a state of oxide or a state in which the color pigment is doped in zirconia.

In a case where two or more zirconia layers contain a color pigment, the content and the type of the color pigment may be different between the zirconia layers.

The sintered body of the present embodiment preferably contains a zirconia layer containing zirconia of which a crystal phase is at least one of a tetragonal crystal (T phase) or a cubic crystal (C phase), more preferably contains zirconia layer containing zirconia having at least a tetragonal crystal as a main phase. The sintered body of the present embodiment still more preferably contains a zirconia layer containing zirconia having a tetragonal crystal as a main phase and a zirconia layer containing zirconia having a cubic crystal as a main phase. The "main phase" in the present embodiment means a crystal phase having a largest existence proportion (proportion of an integrated intensity of a peak) in crystal phases of zirconia. The existence proportion can be obtained from an XRD pattern of the surface of the sintered body.

The following conditions can be exemplified as conditions for measuring the XRD pattern of the surface of the sintered body.

Source: CuK α-rays (λ=1.541862 Å)
Measurement mode: step and scan
Scan condition: 0.000278° per second
Measurement range: 2θ=10-140°
Irradiation width: constant (10 mm)

The obtained XRD pattern is subjected to Rietveld analysis, and the ratio (proportion of an integrated intensity of a peak) of a tetragonal crystal and a cubic crystal is obtained. The crystal phase with a highest proportion may be regarded as a main phase. The measurement of an XRD pattern and the Rietveld analysis can be performed using a general-purpose powder X-ray diffractometer (for example, X'pert PRO MPD manufactured by Spectris Co., Ltd.) and analysis software (for example, RIETAN-2000).

The density of the sintered body of the present embodiment, which is measured through a method according to JIS R 1634, is 5.7 g/cm$^3$ to 6.3 g/cm$^3$ and preferably 5.9 g/cm$^3$ to 6.1 g/cm$^3$, for example. The density in these ranges is a density which corresponds to a relative density of greater than or equal to 99%, and such density is a density of the sintered body having a practical strength, that is, the dense sintered body.

The sintered body of the present embodiment preferably contains at least a zirconia layer having translucency. Furthermore, the sintered body of the present embodiment preferably has a zirconia layer having a total light transmittance (hereinafter, also simply referred to as a "total light transmittance"), with respect to light having a wavelength of 600 nm at a sample thickness of 1.0 mm, of 30% to 50%, 32% to 45%, or 35% to 42%.

The difference in the total light transmittance between zirconia layers layered adjacent to each other in the sintered body of the present embodiment is preferably 1% to 10% and more preferably 1.5% to 5%.

The total light transmittance of the sintered body of the present embodiment is preferably 30% to 50%, 32% to 45%, or 35% to 42%. The total light transmittance of the sintered body of the present embodiment may be measured by cutting an arbitrary portion of the sintered body in the horizontal direction and using the cut portion as a measurement sample obtained by processing the cut portion so as to have a sample thickness of 1 mm.

The total light transmittance can be measured through a method according to JIS K 7361 and can be obtained as a transmittance value obtained using light at a wavelength of 600 nm as incident light and by totaling diffuse transmittance and linear transmittance with respect to the incident light. A sample, with a thickness of 1 mm and a surface roughness (Ra) of less than or equal to 0.02 μm, is used as a measurement sample and is irradiated with light at a wavelength of 600 nm using a general spectrophotometer (for example, V-650 manufactured by JASCO Corporation). The transmittance (diffuse transmittance and linear transmittance) of the sample may be measured by condensing transmitted light using an integrating sphere and may be used as a total light transmittance.

In the sintered body of the present embodiment, a three-point bending strength measured through a method according to JSI R 1601 is preferably greater than or equal to 500 MPa, more preferably greater than or equal to 550 MPa, and still more preferably greater than or equal to 600 MPa. Examples of the three-point bending strength include less than 1,100 MPa and less than or equal to 1,000 MPa.

Figure 4:
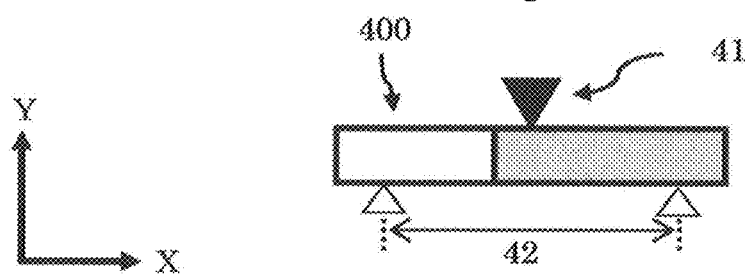
FIG. 4 is a schematic diagram showing a method for measuring a three-point bending strength.

FIG. 4 is a schematic diagram showing a state of measuring a three-point bending strength of a sintered body (400) consisting of two zirconia layers. The sintered body (400) is shown as a sintered body having a structure in which two zirconia layers having different layer thicknesses are layered. In FIG. 4, a layering direction is shown in an X-axis direction and a horizontal direction is shown in a Y-axis direction. A measurement sample to be used for measuring the three-point bending strength is a rectangular parallelepiped sintered body produced while setting the width and the thickness in the layering direction and the length in the horizontal direction. The dimension of the measurement sample is 4 mm in width, 3 mm in thickness, and 45 mm in length. As shown in FIG. 4, the three-point bending strength may be measured by applying a load (41) to the measurement sample (400) so as to be perpendicular to the length of the measurement sample. The measurement sample may be disposed so that the load (41) is applied at the middle of fulcrum points distance (42). The fulcrum points distance is 30 mm.

Next, main points different from the above-described sintered body will be described with reference to an embodiment in which the layered body is a calcined body.

The calcined body of the present embodiment is a calcined body which has a structure, in which two or more zirconia composition layers containing zirconia which contains a stabilizer and has a necking structure are layered, and includes at least:

a first zirconia composition layer containing zirconia having a stabilizer content of greater than or equal to 4 mol %; and a second zirconia composition layer containing zirconia having a stabilizer content different from that of the zirconia contained in the first zirconia composition layer.

The calcined body is a so-called layered body which is a composition having a multilayer structure, and is a layered body consisting of so-called calcined particles which are structures having a necking structure. The calcined body can be processed as necessary to be used as a precursor of a sintered body, and is also called a pre-sintered body, soft-sintered body or a semi-sintered body.

Figure 5:
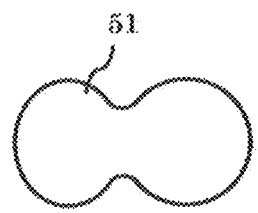
FIG. 5 is a schematic diagram showing zirconia having a necking structure.

The necking structure is a structure of zirconia subjected to a heat treatment at a temperature lower than a sintering temperature, and is a structure in which zirconia particles chemically adhere to each other. As shown in FIG. 5, a part of the particle shape of zirconia (51), which is contained in the zirconia composition layers of the calcined body, in a powder composition can be observed from the zirconia (51). In the present embodiment, the structure having a necking structure is a structure made of zirconia in an initial stage of sintering. This structure having a necking structure is different from the sintered structure, that is, the structure consisting of zirconia crystal grains in a later stage of sintering. Accordingly, the calcined body of the present embodiment can also be regarded as a layered body including two or more layers containing zirconia which contains a stabilizer, has a necking structure, and is consisting of zirconia particles.

The calcined body, instead of zirconia layers, has zirconia composition layers (hereinafter, also referred to as "composition layers") containing zirconia which contains a stabilizer and has a necking structure, and has the same structure as the layered structure shown in FIG. 1 or 2.

In the calcined body, a warp is preferably less than or equal to 1.0 mm, more preferably less than or equal to 0.3 mm, still more preferably less than or equal to 0.2 mm, still more preferably less than or equal to 0.1 mm, and still more preferably less than or equal to 0.05 mm. The calcined body preferably does not have a warp (warp of 0 mm), but may have a warp (warp of greater than or equal to 0 mm) to a degree that cannot be measured by a gauge. The calcined body has, for example, a warp greater than 0 mm or greater than or equal to 0.01 mm. It is preferable that the warp be less than or equal to 0.06 mm, less than or equal to 0.05 mm, or less than or equal to a measurement limit (less than 0.03 mm).

In the calcined body, the deformation amount is preferably less than or equal to 1.0, more preferably less than or equal to 0.5, still more preferably less than or equal to 0.2, and still more preferably less than or equal to 0.15. The deformation amount is, for example, greater than or equal to 0, greater than or equal to 0.01, or greater than or equal to 0.05.

Zirconia contained in the calcined body is preferably in a state in which zirconia obtained by subjecting a zirconia sol to a heat treatment is heat-treated at a temperature lower than a sintering temperature, more preferably in a state in which zirconia obtained by subjecting a zirconia sol obtained by hydrolyzing a zirconium compound to a heat treatment is heat-treated at a temperature lower than a sintering temperature, and still more preferably in a state in which zirconia obtained by subjecting a zirconia sol obtained by hydrolyzing zirconium oxychloride to a heat treatment is heat-treated at a temperature lower than a sintering temperature.

The stabilizer content of stabilizer-containing zirconia contained in a first composition layer (hereinafter, also referred to as a "first composition layer"), the stabilizer content of stabilizer-containing zirconia contained in a second composition layer (hereinafter, also referred to as a "second composition layer"), and the stabilizer content of stabilizer-containing zirconia contained in a third composition layer (hereinafter, also referred to as a "third composition layer") may be the same as those of the first layer, the second layer, and the third layer, respectively.

The stabilizer contents of the calcined body and each composition layer are arbitrary, but may be the same as those of the sintered body of the present embodiment described above.

The calcined body more preferably contains a zirconia composition layer containing zirconia having at least a tetragonal crystal or a cubic crystal as a main phase.

The density of the calcined body is, for example, 2.4 g/cm$^3$ to 3.7 g/cm$^3$ and preferably 3.1 g/cm$^3$ to 3.5 g/cm$^3$. The density in these ranges corresponds to a relative density of 40% to 60%. The calcined body may be a layered body having a strength suitable for processing such as CAD/CAM processing.

The density of the calcined body is obtained from a weight obtained by weight measurement and a volume obtained by dimensional measurement.

The calcined body and each composition layer are opaque and have a total light transmittance of 0%. In consideration of a measurement error, the total light transmittance is, for example, 0% to 0.2%.

The calcined body may have such a strength that a defect is less likely to occur during processing such as CAD/CAM or cutting.

The layered body of the present embodiment can be used for well-known zirconia applications such as structural materials or optical materials. In the case where the layered body is a sintered body, it can be suitably used as dental materials such as dentures, for example, a crown and a bridge. In addition, in the case where the layered body is a calcined body, it can be suitably used as precursors of dental materials such as dentures, for example, a crown and a bridge, and can be used as dental prosthetic materials such as a blank, a disc, a block, and a mill blank, and precursors thereof. Furthermore, the layered body can be provided as dental materials containing the layered body of the present embodiment.

Next, a method for producing a layered body of the present embodiment will be described.

A production method, in an aspect in which the layered body of the present embodiment is a sintered body, is a method for producing a layered body, the method including a step of sintering a green body at 1,200° C. to 1,600° C.,
  wherein the green body has a structure in which two or more powder composition layers consisting of a powder composition containing stabilizer-containing zirconia and a binding agent are layered, includes at least
  a first powder composition layer containing a binding agent and zirconia which has a stabilizer content of higher than or equal to 4 mol % and
  a second powder composition layer containing a binding agent and zirconia which has a stabilizer content different from that of the zirconia contained in the first powder composition layer; and
  has a difference in a binding agent content of 0.01 wt % or more between the first powder composition layer and the second powder composition layer.

In addition another production method of the present embodiment is a method for producing a layered body, the method including:
  a step of calcining a green body at a temperature of is higher than or equal to 800° C. and lower than 1,200° C. to obtain a calcined body and
  a step of sintering the calcined body at 1,200° C. to 1,600° C.,
  wherein the green body has a structure, in which two or more powder composition layers consisting of a powder composition containing stabilizer-containing zirconia and a binding agent are layered, includes at least
  a first powder composition layer containing a binding agent and zirconia which has a stabilizer content of higher than or equal to 4 mol % and
  a second powder composition layer containing a binding agent and zirconia which has a stabilizer content different from that of the zirconia contained in the first powder composition layer, and
  has a difference in a binding agent content of 0.01 wt % or more between the first powder composition layer and the second powder composition layer.

In addition, still another production method of the present embodiment is a method for producing a layered body, the method including a step of sintering a calcined body at 1,200° C. to 1,600° C.,
  wherein the calcined body has a structure, in which two or more zirconia composition layers containing zirconia which contains a stabilizer and has a necking structure are layered, and includes at least
  a first zirconia composition layer containing zirconia having a stabilizer content of greater than or equal to 4 mol % and
  a second zirconia composition layer containing zirconia having a stabilizer content different from that of the zirconia contained in the first zirconia composition layer.

A production method, in an aspect in which the layered body of the present embodiment, is a calcined body is a method for producing a layered body, the method including: a step of calcining a green body at a temperature of higher than or equal to 800° C. and lower than 1,200° C.,
  wherein the green body has a structure in which two or more powder composition layers consisting of a powder composition containing stabilizer-containing zirconia and a binding agent are layered, includes at least
  a first powder composition layer containing a binding agent and zirconia which has a stabilizer content of higher than or equal to 4 mol % and
  a second powder composition layer containing a binding agent and zirconia which has a stabilizer content different from that of the zirconia contained in the first powder composition layer, and
  has a difference in a binding agent content between the first powder composition layer and the second powder composition layer exceeds 0.01 wt %.

The green body used for the production method of the present embodiment is a green body which has a structure in which two or more powder composition layers consisting of a powder composition containing stabilizer-containing zirconia and a binding agent are layered, includes at least
  a first powder composition layer containing a binding agent and zirconia which has a stabilizer content of higher than or equal to 4 mol % and
  a second powder composition layer containing a binding agent and zirconia which has a stabilizer content different from that of the zirconia contained in the first powder composition layer, and
  has a difference in a binding agent content between the first powder composition layer and the second powder composition layer exceeds 0.01 wt %.

It is known that a powder composition containing a binding agent improves the cohesive strength of zirconia and suppresses defects, such as cracks or chips, during molding. In general, it is necessary to make the content of a binding agent in a powder composition, which is used for producing a green body, uniform in order to make the strength of the obtained green body uniform. On the other hand, the binding agent in the green body of the present embodiment not only improves the strength of the green body but also suppresses a generation of stress between layered layers, by differing the binding agent contents between the layers. Such function is considered as different than a function known in prior art As a result, it is considered that deformation during molding is suppressed and the green body, consisting of a layered body in which powder compositions containing zirconia having different stabilizer contents are layered, can be heat-treated without causing excessive defects.

Hereinafter, main points of the green body used for the production method of the present embodiment which are different from those of the above-described sintered body will be described.

The green body used for the production method of the present embodiment is a green body which has a structure in which two or more powder composition layers consisting of a powder composition containing stabilizer-containing zirconia and a binding agent are layered; includes at least

- a first powder composition layer containing a binding agent and zirconia which has a stabilizer content of higher than or equal to 4 mol % and
- a second powder composition layer containing a binding agent and zirconia which has a stabilizer content different from that of the zirconia contained in the first powder composition layer, and
- has a difference in a binding agent content between the first powder composition layer and the second powder composition layer exceeds 0.01 wt %.

The green body is a so-called layered body which is a composition having a multilayer structure, and is a layered body consisting of a powder composition. The green body can be used as a precursor of a calcined body or a sintered body.

The green body, instead of zirconia layers, has powder composition layers (hereinafter, also referred to as "powder layers") consisting of a powder composition containing stabilizer-containing zirconia and a binding agent, and has the same structure as the layered structure shown in FIG. 1 or 2. Accordingly, the green body can also be regarded as a layered body including two or more layers containing a binding agent and powder of stabilizer-containing zirconia.

In the green body, the warp is preferably less than or equal to 1.0 mm, more preferably less than or equal to 0.3 mm, still more preferably less than or equal to 0.1 mm, and still more preferably less than or equal to 0.05 mm. The green body preferably does not have a warp (warp of 0 mm), but may have a warp (warp of greater than or equal to 0 mm) to a degree that cannot be measured by the gauge. The green body has, for example, a warp greater than 0 mm, or greater than or equal to 0.01 mm. It is preferable that the warp is less than or equal to 0.06 mm, less than or equal to 0.05 mm, or less than or equal to a measurement limit (less than 0.03 mm).

In the green body, the deformation amount is preferably less than or equal to 1.0, more preferably less than or equal to 0.5, still more preferably less than or equal to 0.2, and still more preferably less than or equal to 0.15. The deformation amount is, for example, greater than or equal to 0, greater than or equal to 0.01, or greater than or equal to 0.05.

Zirconia contained in the powder layers is preferably zirconia obtained by subjecting a zirconia sol to a heat treatment, more preferably zirconia obtained by subjecting a zirconia sol obtained by hydrolyzing a zirconium compound to a heat treatment, and still more preferably zirconia obtained by subjecting a zirconia sol obtained by hydrolyzing zirconium oxychloride to a heat treatment.

The zirconia contained in the powder layers preferably zirconia powder. The zirconia powder preferably has an average particle size of 0.3 µm to 0.7 µm and 0.4 µm to 0.5 µm.

The binding agent contained in the powder layers is preferably a binding agent that vaporizes at a temperature lower than or equal to 1,200° C., more preferably an organic binding agent, and still more preferably an organic binding agent having fluidity at room temperature (for example, 10° C. to 30° C.). In addition, the binding agent may not contain a plasticizer or a releasing agent. The organic binding agent is one or more selected from the group consisting of polyvinyl alcohol, polyvinyl butyrate, wax, and an acrylic resin, preferably one or more of polyvinyl alcohol and an acrylic resin, and more preferably an acrylic resin. The acrylic resin in the present embodiment is a polymer containing at least any of an acrylic ester or a methacrylic ester. The acrylic resin contained in a powder composition may be used as a binding agent for ceramics. Specific examples of acrylic resins include one or more selected from the group consisting of polyacrylic acid, polymethacrylic acid, an acrylic acid copolymer, and a methacrylic acid copolymer, and derivatives thereof.

The stabilizer content of stabilizer-containing zirconia contained in a first powder layer, the stabilizer content of stabilizer-containing zirconia contained in a second powder layer, and the stabilizer content of stabilizer-containing zirconia contained in an optional powder layer may be the same as those of the first layer, the second layer, and the optional layer, respectively.

The stabilizer contents of the green body and each powder layer are arbitrary, but may be the same as those of the sintered body of the present embodiment described above.

From the viewpoint of suppressing defects during molding, the binding agent content of each powder layer is preferably greater than or equal to 1.5 wt %, more preferably 1.5 wt % to 8.0 wt %, still more preferably 2.0 wt % to 6.0 wt %, and still more preferably 2.5 wt % to 5.5 wt %.

In the green body, the difference in the binding agent content (hereinafter, also referred to as a "difference in the amount of the binding agent") between the first powder layer and the second powder layer exceeds 0.01 wt %, and is preferably greater than or equal to 0.03 wt %. In this manner, the first powder layer and the second powder layer of the green body have different binding agent contents. Accordingly, generation of stress during molding is suppressed. From the viewpoint of suppressing the generation of stress, examples of the difference in the amount of the binding agent include greater than 0.01 wt % and less than or equal to 5 wt % or 0.03 wt % to 3.5 wt %, and are preferably 0.04 wt % to 3 wt %, more preferably 0.05 wt % to 2 wt %, still more preferably 0.06 wt % to 1.5 wt %, and still more preferably 0.07 wt % to 1 wt %. In another embodiment, examples of the difference in the amount of the binding agent include greater than 0.01 wt % and less than or equal to 3 wt %, 0.03 wt % to 2 wt %, 0.1 wt % to 1.2 wt %, 0.12 wt % to 1 wt %, and 0.13 wt % to 0.5 wt %.

The binding agent content is a ratio of the weight of the binding agent to the weight of a powder composition in a powder layer excluding the binding agent ({binding agent/(powder composition−binding agent)}×100). When producing the powder composition, the total mass of components (for example, a stabilizer, zirconia, and alumina in terms of an oxide) of the powder composition other than the binding agent is obtained, and then, the mass ratio of the target binding agent with respect to the obtained total mass is obtained to produce the powder composition, for example.

In order to suppress a warp of the green body, it is preferable to adjust the binding agent content in each powder layer according to the stabilizer contents of adjacent powder layers. Examples of the first powder layer and the second powder layer include any case that the contents of a stabilizer and a binding agent in the second powder layer are higher than those in the first powder layer, the contents of a stabilizer and a binding agent in the second powder layer are lower than those in the first powder layer, the content of a stabilizer in the second powder layer is higher than that in the first powder layer and the content of a binding agent in the second powder layer is lower than that in the first powder layer, or the content of a stabilizer in the second powder layer is lower than that in the first powder layer and the content of a binding agent in the second powder layer is higher than that in the first powder layer.

The first powder layer and the second powder layer are preferably any case that the content of a stabilizer in the second powder layer is higher than that in the first powder layer and the content of a binding agent in the second powder layer is lower than that in the first powder layer, or the content of a stabilizer in the second powder layer is lower than that in the first powder layer and the content of a binding agent in the second powder layer is higher than that in the first powder layer. The contents of a stabilizer and a binding agent between the first powder layer and the second powder layer may be different from each other. It is preferable that the difference in the amount of the binding agent be large since this tends to cause suppression of a warp of the green body. In addition, it is preferable that one of the first powder layer and the second powder layer have a lower stabilizer content and a higher binding agent content than the other powder layer.

In addition, it is preferable that one powder layer containing zirconia having a low stabilizer content in powder layers layered adjacent to each other have higher binding agent content than the other powder layer. On the other hand, in a case where zirconia contained in any one of powder layers layered adjacent to each other is zirconia in which two or more zirconia compounds, having different stabilizer contents, are mixed with each other, one powder layer containing zirconia having a low stabilizer content preferably has a lower binding agent content than the other powder layer.

From the viewpoint of operability, a powder composition contained in a powder layer is preferably powder (hereinafter, also referred to as "granulated powder") in a state in which zirconia powder and a binding agent are granulated and more preferably granulated powder (hereinafter, also referred to as "powder granules") granulated into granules through spray-drying or the like.

The particle size of granulated powder is arbitrary. Examples of average aggregation sizes include 1 μm to 150 μm, preferably 1 μm to 100 μm, more preferably 5 μm to 50 μm, and still more preferably 5 μm to 30 μm. 20 μm to 50 μm can be exemplified as another embodiment.

The average aggregation size in the present embodiment is a size corresponding to cumulative 50% in volume particle size distribution measurement. The volume particle size distribution is a value that can be measured using a general-purpose device (for example, MT3100II manufactured by MicrotracBEL Corp.) and is a volume size of a particle approximated to a sphere.

The green body more preferably contains a powder layer containing zirconia having at least a tetragonal crystal or a cubic crystal as a main phase.

The density of the green body is, for example, 2.4 $g/cm^3$ to 3.7 $g/cm^3$ and preferably 3.1 $g/cm^3$ to 3.5 $g/cm^3$. The density in these ranges corresponds to a relative density of 40% to 60%.

The density of the green body is obtained from a weight obtained by weight measurement and a volume obtained by dimensional measurement.

The green body and each powder layer are opaque and has a total light transmittance of 0%. In consideration of a measurement error, the total light transmittance is, for example, 0% to 0.2%.

The green body may have such a strength that cracks or chips are not caused when used during calcination or sintering.

The green body is obtained by layering powder compositions and molding the layered powder compositions. Each powder composition is obtained by mixing zirconia powder with a binding agent at an arbitrary desired ratio through a well-known method. The molding is preferably press-molding. For example, a molding die is filled with a powder composition having a composition corresponding to a lowermost layer to obtain the lowermost layer. Thereafter, the molding die is filled with a powder composition having a composition corresponding to a composition of a layer adjacent to the lowermost layer, on the lowermost layer. In a case of obtaining a green body having a structure in which three or more powder layers are layered, the same operation may be repeated to layer necessary powder compositions. After filling the molding die with a powder composition having a composition corresponding to a composition of an uppermost layer, a preliminary green body is obtained by performing uniaxial pressing at an arbitrary pressure. A green body is obtained by subjecting the obtained preliminary green body to cold isostatic pressing (hereinafter, also referred to as "CIP") processing. At the time of layering, it is unnecessary to apply vibration, such as vibration using a vibrator, for forming a mixed layer between layers. In addition, the uniaxial pressing is preferably performed after the filling of the molding die with a powder composition having a composition corresponding to the uppermost layer, and the pressing is preferably not performed before filling the molding die with a powder composition having a composition corresponding to the uppermost layer.

The molding pressure of the uniaxial pressing is preferably 15 MPa to 200 MPa and more preferably 18 MPa to 100 MPa. A warp of a green body tends to be suppressed as the molding pressure of the uniaxial pressing increases. As the pressure of the CIP processing, the molding pressure is, for example, 98 MPa to 392 MPa.

The green body becomes a calcined body by processing the green body at a temperature lower than a sintering temperature. Well-known methods can be used for the calcination method and the calcination conditions.

The holding temperature (hereinafter, also referred to as a "calcination temperature") during calcination is, for example, 800° C. to 1,200° C., preferably 900° C. to 1,150° C., and more preferably 950° C. to 1,100° C.

The holding time (hereinafter, also referred to as "calcination time") at a calcination temperature is preferably 0.5 hours to 5 hours and more preferably 0.5 hours to 3 hours.

The atmosphere (hereinafter, also referred to as a "calcination atmosphere") in the calcination step is preferably an atmosphere other than a reducing atmosphere, more preferably at least any of an oxygen atmosphere or an air atmosphere, and still more preferably an air atmosphere.

In the production method of the present embodiment, any of the green body or the calcined body (hereinafter, these are also collectively referred to as a "green body or the like") is processed at a temperature of higher than 1,200° C. to 1,600° C. Accordingly, the green body or the like becomes a sintered body. Prior to sintering, the green body or the like may be processed into an arbitrary shape.

Well-known methods can be used for the sintering method and the sintering conditions. Examples of the sintering method include at least one selected from the group consisting of normal pressure sintering (pressureless sintering), HIP processing, SPS, and vacuum sintering. The sintering method is preferably normal pressure sintering and more preferably normal pressure sintering in an air atmosphere since these are widely used as industrial sintering methods. As the sintering method, it is preferable to perform only normal pressure sintering, and it is more preferable not to perform pressure sintering after normal pressure sintering. Accordingly, it is possible to obtain a sintered body as a normal pressure sintered body. The normal pressure sintering in the present embodiment is a sintering method performed by simply heating an object to be sintered without applying an external force to the object during sintering.

The holding temperature (hereinafter, also referred to as a "sintering temperature") during sintering is 1,200° C. to 1,600° C., preferably 1,300° C. to 1,580° C., more preferably 1,400° C. to 1,560° C., still more preferably 1,430° C. to 1,560° C., and still more preferably 1,480° C. to 1,560° C. In another embodiment, the sintering temperature is 1,450° C. to 1,650° C., preferably 1,500° C. to 1,650° C., and more preferably 1,550° C. to 1,650° C.

The temperature rising rate up to a sintering temperature is, for example, 50° C./hour to 800° C./hour, preferably 100° C./hour to 800° C./hour, more preferably 150° C./hour to 800° C./hour, still more preferably 150° C./hour to 700° C./hour.

The holding time (hereinafter, also referred to as a "sintering time") at a sintering temperature varies depending on the sintering temperature, and is preferably 1 hour to 5 hours, more preferably 1 hour to 3 hours, and still more preferably 1 hour to 2 hours.

The atmosphere (hereinafter, also referred to as a "sintering atmosphere") of sintering is preferably an atmosphere other than a reducing atmosphere, more preferably at least any of an oxygen atmosphere or an air atmosphere, and still more preferably an air atmosphere. The air atmosphere mainly consists of nitrogen and oxygen, and the oxygen concentration is, for example, about 18 to 23 volume %.

Preferred sintering conditions in a sintering step are, for example, normal pressure sintering in an air atmosphere.

EXAMPLES

Hereinafter, the layered body of the present embodiment will be described using examples. However, the present disclosure is not limited to these examples.
(Density Measurement)

The densities of a green body and a calcined body are obtained from a weight measured by weight measurement and a volume measured by dimensional measurement. In the dimensional measurement, a disk-shaped sample was used, diameters of upper ends, diameters of lower ends, and thicknesses were measured at four points respectively using calipers, and an average value of the thicknesses and an average value of the diameters of the upper and lower ends were deemed as dimension.

The density of a sintered body is measured through a method according to JIS R 1634.
(Warp and Deformation Amount)

A disk-shaped green body, calcined body, or sintered body is used as a measurement sample to obtain each deformation amount from the following equation.

Deformation amount=(warp: mm)/dimension: mm)×100

The measurement of a warp was performed through the measurement method shown in FIG. 3. The measurement sample was disposed so that a convex portion of the measurement sample comes into contact with a horizontal plate. The warp was measured by inserting a thickness gauge (product name: 75A19 manufactured by Nagai Gauge Co., Ltd.) according to JIS B 7524:2008 into a gap formed between the horizontal plate and a bottom surface. The measurement was performed by inserting the gauge disposed parallel to the horizontal plate into the gap formed between the horizontal plate and the bottom surface of the measurement sample, and measuring a gauge thickness becoming a maximum thickness of the gauge which was able to be inserted into the gap, and the gauge thickness was regarded as a warp. Warps were measured from gauge thicknesses of 0.03 mm, and measured sequentially with an interval of 0.01 mm, by using a single gauge or combining gauges.

For the dimension of the measurement sample, diameters of upper ends and diameters of lower ends were measured at four points using calipers to obtain an average value of the diameters of the upper and lower ends.
(Total Light Transmittance)

The total light transmittance was measured through a method according to JIS K 7361 using a spectrophotometer (device name: V-650 manufactured by JASCO Corporation). A disk-shaped sample was used for the measurement. Prior to the measurement, both surfaces of the sample were polished to obtain a sample thickness of 1 mm and a surface roughness (Ra) of 0.02 μm or less. Light at a wavelength of 220 nm to 850 nm was transmitted through the sample to measure the transmittance at each wavelength by condensing the transmitted light using an integrating sphere, and the transmittance at a wavelength of 600 nm was regarded as a total light transmittance.
(Three-Point Bending Strength)

The three-point bending strength was measured through a method according to JIS R 1601. The length of a measurement sample was taken in a layering direction, and the shape of the measurement sample was formed into a column shape having a width of 4 mm, a thickness of 3 mm, and a length of 45 mm. The measurement was performed by setting the fulcrum points distance to 30 mm and applying a load to the measurement sample in a horizontal direction.
(Average Aggregation Size)

The average aggregation size was measured by charging a powder granule sample into a microtrac particle size distribution meter (device name: MT3100II manufactured by MicrotracBEL Corp.) A particle size at which the cumulative volume became 50% was regarded as an average aggregation size.
(Crystal Phase)

The crystal phase of a layered body sample was measured through XRD measurement under the following conditions.

A general XRD device (device name: X'pert PRO MPD manufactured by Spectris Co., Ltd.) was used as a measurement device.

Source: CuK α-ray (λ=1.541862 Å)
Measurement mode: step and scan
Scan condition: 0.000278° per second
Measurement range: 2θ=10-140°
Irradiation width: constant (10 mm)

Rietveld analysis of an obtained XRD pattern was performed using analysis software (RIETAN-2000), and the ratio (proportion of an integrated intensity of a peak) of a tetragonal crystal to a cubic crystal was obtained. The crystal phase with a high proportion was regarded as a main phase.

Synthesis Example 1 (Synthesis of Zirconia Powder)

(Zirconia Powder A1)

A hydrated zirconia sol was obtained by subjecting a zirconium oxychloride aqueous solution to a hydrolysis reaction. Yttrium chloride was added to the hydrated zirconia sol so that the yttria concentration became 5.5 mol %, and then, the mixture was dried at 180° C. The dried hydrated zirconia sol was fired at 1,160° C. for 2 hours, and was then washed with distilled water and dried at 110° C. in atmospheric air. α-Alumina was mixed with the dried powder to obtain a powder mixture. Distilled water was added to the powder mixture to obtain slurry, which was then processed with a ball mill for 22 hours.

After the ball mill processing, an acrylic acid-based binder (acrylic resin) was added to and mixed with the slurry as a binding agent so that the weight ratio of the binder to the powder mixture in the slurry became 3.13 wt %. The mixed slurry was spray-dried at 180° C., and powder granules which had an average aggregation size of 45 μm and contained 3.13 wt % of an acrylic acid-based binder (acrylic resin), 0.05 wt % of alumina, and the balance being 5.5 mol % yttria-containing zirconia were obtained.

(Zirconia Powder A2)

Powder granules which had an average aggregation size of 44 μm and contained 3.5 wt % of an acrylic acid-based binder, 0.05 wt % of alumina, and the balance being 5.5 mol % yttria-containing zirconia were obtained through the same method as that for the zirconia powder A1 except that the acrylic acid-based binder was added to and mixed with slurry so that the weight ratio of the binder to the slurry became 3.5 wt %.

(Zirconia Powder A3)

Powder granules which had an average aggregation size of 46 μm and contained 4.0 wt % of an acrylic acid-based binder, 0.05 wt % of alumina, and the balance being 5.5 mol % yttria-containing zirconia were obtained through the same method as that for the zirconia powder A1 except that the acrylic acid-based binder was added to and mixed with slurry so that the weight ratio of the binder to the slurry became 4.0 wt %.

(Zirconia Powder A4)

Powder granules which had an average aggregation size of 46 μm and contained 5.0 wt % of an acrylic acid-based binder, 0.05 wt % of alumina, and the balance being 5.5 mol % yttria-containing zirconia were obtained through the same method as that for the zirconia powder A1 except that the acrylic acid-based binder was added to and mixed with slurry so that the weight ratio of the binder to the slurry became 5.0 wt %.

(Zirconia Powder A5)

Powder granules which had an average aggregation size of 45 μm and contained 6.0 wt % of an acrylic acid-based binder, 0.05 wt % of alumina, and the balance being 5.5 mol % yttria-containing zirconia were obtained through the same method as that for the zirconia powder A1 except that the acrylic acid-based binder was added to and mixed with slurry so that the weight ratio of the binder to the slurry became 6.0 wt %.

(Zirconia Powder A6)

Powder granules which had an average aggregation size of 43 μm and contained 3.05 wt % of an acrylic acid-based binder, 0.05 wt % of alumina, and the balance being 5.2 mol % yttria-containing zirconia were obtained through the same method as that for the zirconia powder A1 except that yttrium chloride was added to the hydrated zirconia sol so that the yttria concentration became 5.2 mol % and except that the acrylic acid-based binder was added to and mixed with slurry so that the weight ratio of the binder to the slurry became 3.05 wt %.

(Zirconia Powder A7)

Powder granules which had an average aggregation size of 44 μm and contained 3.08 wt % of an acrylic acid-based binder, 0.05 wt % of alumina, and the balance being 5.8 mol % yttria-containing zirconia were obtained through the same method as that for the zirconia powder A1 except that yttrium chloride was added to the hydrated zirconia sol so that the yttria concentration became 5.8 mol % and except that the acrylic acid-based binder was added to and mixed with slurry so that the weight ratio of the binder to the slurry became 3.08 wt %.

(Zirconia Powder B1)

Dried powder was obtained through the same method as that for the zirconia powder A1. α-alumina and distilled water were mixed with the dried powder to obtain slurry containing powder containing 0.05 wt % of alumina and the balance being 5.5 mol % yttria-containing zirconia, by processing the mixture with a ball mill for 22 hours.

In addition, dried powder was obtained through the same method as that for the zirconia powder A1 except that yttrium chloride was added to the hydrated zirconia sol so that the yttria concentration became 3.0 mol %. α-Alumina and distilled water were mixed with the dried powder to obtain slurry containing powder containing 0.05 wt % of alumina and the balance being 3.0 mol % yttria-containing zirconia, by processing the mixture with a ball mill for 22 hours.

The obtained both slurries were mixed with each other to obtain slurry containing powder containing 0.05 wt % of alumina and 4.0 mol % yttria-containing zirconia. Then, an acrylic acid-based binder was added to and mixed with the slurry so that the weight ratio of the binder to the slurry became 3.05 wt %. The mixed slurry was spray-dried at 180° C., and powder granules which had an average aggregation size of 43 μm and contained 3.05 wt % of an acrylic acid-based binder, 0.05 wt % of alumina, and the balance being 4.0 mol % yttria-containing zirconia were obtained.

(Zirconia Powder B2)

Powder granules which had an average aggregation size of 46 μm and contained 3.08 wt % of an acrylic acid-based binder, 0.05 wt % of alumina, and the balance being 4.0 mol % yttria-containing zirconia were obtained through the same method as that for the zirconia powder B1 except that slurry containing powder containing 0.05 wt % of alumina and the balance being 5.5 mol % yttria-containing zirconia is mixed with slurry containing powder containing 0.05 wt % of alumina and the balance being 2.5 mol % yttria-containing zirconia and except that the acrylic acid-based binder was added to and mixed with the slurry mixture so that the weight ratio of the binder to the slurry mixture became 3.08 wt %.

(Zirconia Powder B3)

Powder granules which had an average aggregation size of 45 μm and contained 2.0 wt % of an acrylic acid-based binder, 0.05 wt % of alumina, and the balance being 4.15 mol % yttria-containing zirconia were obtained through the same method as that for the zirconia powder B1 except that slurry containing powder containing 0.05 wt % of alumina and the balance being 5.5 mol % yttria-containing zirconia is mixed with slurry containing powder containing 0.05 wt % of alumina and the balance being 2.5 mol % yttria-containing zirconia and except that the acrylic acid-based binder was added to and mixed with the slurry mixture so that the weight ratio of the binder to the slurry mixture became 2.0 wt %.

(Zirconia Powder B4)

Powder granules which had an average aggregation size of 45 μm and contained 3.06 wt % of an acrylic acid-based binder, 0.05 wt % of alumina, and the balance being 4.5 mol % yttria-containing zirconia were obtained through the same method as that for the zirconia powder B1 except that the mixing ratio of both slurry preparations was changed so that the yttria content became 4.5 mol % and except that the acrylic acid-based binder was added to and mixed with the slurry preparations so that the weight ratio of the binder to the slurry preparations became 3.06 wt %.

(Zirconia Powder C1)

A hydrated zirconia sol was obtained by subjecting a zirconium oxychloride aqueous solution to a hydrolysis reaction. Yttrium chloride was added to the hydrated zirconia sol so that the yttria concentration became 4.05 mol %, and then, the mixture was dried at 180° C. The dried hydrated zirconia sol was sintered at 1,160° C. for 2 hours, and was then washed with distilled water and dried at 110° C. in atmospheric air. α-Alumina was mixed with the dried powder to obtain a powder mixture. Distilled water was added to the powder mixture to obtain slurry, which was then processed with a ball mill for 22 hours.

After the ball mill processing, an acrylic acid-based binder was added to and mixed with the slurry so that the weight ratio of the binder to the powder mixture in the slurry became 3.30 wt %. The mixed slurry was spray-dried at 180° C., and powder granules which had an average aggregation size of 43 μm and contained 3.30 wt % of an acrylic acid-based binder, 0.05 wt % of alumina, and the balance being 4.05 mol % yttria-containing zirconia were obtained.

(Zirconia Powder C2)

Powder granules which had an average aggregation size of 46 μm and contained 3.20 wt % of an acrylic acid-based binder, 0.05 wt % of alumina, and the balance being 4.10 mol % yttria-containing zirconia were obtained through the same method as that for the zirconia powder C1 except that yttrium chloride was added to the hydrated zirconia sol so that the yttria concentration became 4.10 mol % and except that the acrylic acid-based binder was added to and mixed with slurry so that the weight ratio of the binder to the slurry became 3.20 wt %.

(Zirconia Powder C3)

Powder granules which had an average aggregation size of 44 μm and contained 3.29 wt % of an acrylic acid-based binder, 0.05 wt % of alumina, and the balance being 4.25 mol % yttria-containing zirconia were obtained through the same method as that for the zirconia powder C1 except that yttrium chloride was added to the hydrated zirconia sol so that the yttria concentration became 4.25 mol % and except that the acrylic acid-based binder was added to and mixed with slurry so that the weight ratio of the binder to the slurry became 3.29 wt %.

(Zirconia Powder C4)

Powder granules which had an average aggregation size of 44 μm and contained 3.50 wt % of an acrylic acid-based binder and the balance being 4.00 mol % yttria-containing zirconia were obtained through the same method as that for the zirconia powder C1 except that yttrium chloride was added to the hydrated zirconia sol so that the yttria concentration became 4.00 mol % and except that no α-alumina was used and the acrylic acid-based binder was added to and mixed with slurry so that the weight ratio of the binder to the slurry became 3.50 wt %.

(Zirconia Powder C5)

Powder granules which had an average aggregation size of 46 μm and contained 3.50 wt % of an acrylic acid-based binder, 0.05 wt % of alumina, and the balance being 4.00 mol % yttria-containing zirconia were obtained through the same method as that for the zirconia powder C1 except that yttrium chloride was added to the hydrated zirconia sol so that the yttria concentration became 4.00 mol % and except that the acrylic acid-based binder was added to and mixed with slurry so that the weight ratio of the binder to the slurry became 3.50 wt %.

(Zirconia Powder C6)

Powder granules which had an average aggregation size of 45 μm and contained 3.50 wt % of an acrylic acid-based binder, 0.10 wt % of alumina, and the balance being 4.00 mol % yttria-containing zirconia were obtained through the same method as that for the zirconia powder C1 except that yttrium chloride was added to the hydrated zirconia sol so that the yttria concentration became 4.00 mol %, α-alumina was mixed therewith so that the alumina content became 0.10 wt %, and the acrylic acid-based binder was added to and mixed with slurry so that the weight ratio of the binder to the slurry became 3.50 wt %.

Example 1

(Green Body)

A mold having an inner diameter of 48 mm was filled with 25 g of zirconia powder A1, and was then tapped to form a first powder layer. The mold was filled with the same amount of zirconia powder B1 on the first powder layer and tapped to form a second powder layer. Then, uniaxial press molding was performed at a pressure of 49 MPa. Thereafter, CIP processing was performed at a pressure of 196 MPa to obtain a layered body consisting of two layers, and the obtained layered body was regarded as a green body of the present example. The stabilizer content of the first powder layer was 5.5 mol % and the stabilizer content of the second powder layer was 4.0 mol %. The difference in the yttria content between the layers was 1.50 mol %, and the difference (the difference in the amount of the binding agent) in the binder content was 0.08 wt %.

The warp of the green body was 0.06 and the deformation amount thereof was 0.12.

(Calcined Body)

The green body was calcined at a temperature rising rate of 20° C./hour, a calcination temperature of 1,000° C., and a calcination time of 2 hours to obtain a layered body which was regarded as a calcined body of the present example.

The warp of the calcined body was 0.06 mm and the deformation amount was 0.12.

(Sintered Body)

The calcined body was sintered at a temperature rising rate of 100° C./hour, a sintering temperature of 1,500° C., and a sintering time of 2 hours in air atmosphere to obtain a layered body which was regarded as a sintered body of the present example.

The warp of the sintered body was 0.06 mm and the deformation amount was 0.15. In addition, the stabilizer content of the sintered body was 4.75 mol %.

Example 2

A layered body was obtained through the same method as in Example 1 except that the zirconia powder A2 and the zirconia powder B2 were used instead of the zirconia powder A1 and the zirconia powder B1, and was regarded as a green body of the present example. The stabilizer content of the first powder layer was 5.5 mol % and the stabilizer content of the second powder layer was 4.0 mol %. The difference in the yttria content between the layers was 1.50 mol %, and the difference in the binder content was 0.42 wt %.

A calcined body and a sintered body were obtained through the same method as in Example 1 except that the green body was used.

The warp was 0.04 mm for the green body, 0.05 mm for the calcined body, and 0.04 mm for the sintered body, and the deformation amount was 0.08 for the green body, 0.10 for the calcined body, and 0.10 for the sintered body.

Example 3

A layered body was obtained through the same method as in Example 1 except that the zirconia powder A4 and the zirconia powder B2 were respectively used instead of the zirconia powder A1 and the zirconia powder B1, and was regarded as a green body of the present example. The stabilizer content of the first powder layer was 5.5 mol % and the stabilizer content of the second powder layer was 4.0 mol %. The difference in the yttria content between the layers was 1.50 mol %, and the difference in the binder content was 1.92 wt %.

A calcined body and a sintered body were obtained through the same method as in Example 1 except that the green body was used.

The warp was less than a measurement limit (less than 0.03 mm) for the green body, 0.04 mm for the calcined body, and less than a measurement limit (less than 0.03 mm) for the sintered body, and the deformation amount was 0.09 for the calcined body.

Example 4

A layered body was obtained through the same method as in Example 1 except that the zirconia powder A5 and the zirconia powder B2 were respectively used instead of the zirconia powder A1 and the zirconia powder B1, and was regarded as a green body of the present example. The stabilizer content of the first powder layer was 5.5 mol % and the stabilizer content of the second powder layer was 4.0 mol %. The difference in the yttria content between the layers was 1.50 mol %, and the difference in the binder content was 2.92 wt %.

A calcined body and a sintered body were obtained through the same method as in Example 1 except that the green body was used.

The warp was 0.04 mm for the green body, 0.03 mm for the calcined body, and less than a measurement limit (less than 0.03 mm) for the sintered body, and the deformation amount was 0.08 for the green body and 0.06 for the calcined body.

It was confirmed from Examples 1 to 4 that there was a tendency that the warp in the case of the calcined body was suppressed with an increase in the difference in the amount of the binding agent when the difference in the yttria content was 1.50 mol %, and that the warp in the state of the sintered body when the difference in the amount of the binding agent was greater than or equal to 0.5 wt % is less than a measurement limit.

Example 5

A layered body was obtained through the same method as in Example 1 except that the zirconia powder B3 was used instead of the zirconia powder B1, and was regarded as a green body of the present example. The stabilizer content of the first powder layer was 5.5 mol % and the stabilizer content of the second powder layer was 4.15 mol %. The difference in the yttria content between the layers was 1.35 mol %, and the difference in the binder content was 1.13 wt %.

A calcined body and a sintered body were obtained through the same method as in Example 1 except that the green body was used.

The warp was 0.04 mm for the green body, 0.03 mm for the calcined body, and 0.03 mm for the sintered body, and the deformation amount was 0.08 for the green body, 0.06 for the calcined body, and 0.08 for the sintered body.

Example 6

A layered body was obtained through the same method as in Example 1 except that the zirconia powder B4 was used instead of the zirconia powder B1, and was regarded as a green body of the present example. The stabilizer content of the first powder layer was 5.5 mol % and the stabilizer content of the second powder layer was 4.5 mol %. The difference in the yttria content between the layers was 1.0 mol %, and the difference in the binder content was 0.07 wt %.

A calcined body and a sintered body were obtained through the same method as in Example 1 except that the green body was used.

The warp was 0.05 mm for the green body, 0.05 mm for the calcined body, and 0.05 mm for the sintered body, and the deformation amount was 0.10 for the green body, 0.10 for the calcined body, and 0.13 for the sintered body. In addition, the stabilizer content of the sintered body was 5.0 mol %.

Example 7

A layered body was obtained through the same method as in Example 1 except that the zirconia powder A3 and the zirconia powder B4 were respectively used instead of the zirconia powder A1 and the zirconia powder B1, and was regarded as a green body of the present example. The stabilizer content of the first powder layer was 5.5 mol % and the stabilizer content of the second powder layer was 4.5 mol %. The difference in the yttria content between the layers was 1.0 mol %, and the difference in the binder content was 0.94 wt %.

A calcined body and a sintered body were obtained through the same method as in Example 1 except that the green body was used.

The warp was 0.04 mm for the green body, 0.04 mm for the calcined body, and 0.03 mm for the sintered body, and the deformation amount was 0.08 for the green body, 0.08 for the calcined body, and 0.08 for the sintered body.

Example 8

A layered body was obtained through the same method as in Example 1 except that the zirconia powder C1 was used instead of the zirconia powder B1, and was regarded as a green body of the present example. The stabilizer content of the first powder layer was 5.5 mol % and the stabilizer content of the second powder layer was 4.05 mol %. The difference in the yttria content between the layers was 1.45 mol %, and the difference in the binder content was 0.2 wt %.

A calcined body and a sintered body were obtained through the same method as in Example 1 except that the green body was used.

The warp was less than a measurement limit (less than 0.03 mm) for all of the green body, the calcined body, and the sintered body.

Example 9

A layered body was obtained through the same method as in Example 1 except that the zirconia powder C2 was used instead of the zirconia powder B1, and was regarded as a green body of the present example. The stabilizer content of the first powder layer was 5.5 mol % and the stabilizer content of the second powder layer was 4.1 mol %. The difference in the yttria content between the layers was 1.4 mol %, and the difference in the binder content was 0.1 wt %.

A calcined body and a sintered body were obtained through the same method as in Example 1 except that the green body was used. The stabilizer content of the sintered body was 4.8 mol %.

The warp was 0.03 mm for the green body, 0.03 mm for the calcined body, and 0.04 mm for the sintered body, and the deformation amount was 0.06 for the green body, 0.06 for the calcined body, and 0.10 for the sintered body.

Example 10

A layered body was obtained through the same method as in Example 1 except that the zirconia powder C3 was used instead of the zirconia powder B1, and was regarded as a green body of the present example. The stabilizer content of the first powder layer was 5.5 mol % and the stabilizer content of the second powder layer was 4.25 mol %. The difference in the yttria content between the layers was 1.25 mol %, and the difference in the binder content was 0.19 wt %.

A calcined body and a sintered body were obtained through the same method as in Example 1 except that the green body was used.

The warp was less than a measurement limit (less than 0.03 mm) for the green body, 0.03 mm for the calcined body, and 0.03 mm for the sintered body, and the deformation amount was 0.06 for the calcined body and 0.08 for the sintered body.

The density was 3.28 g/cm$^3$ for the green body, 3.22 g/cm$^3$ for the calcined body, and 6.06 g/cm$^3$ for the sintered body.

Example 11

A layered body was obtained through the same method as in Example 10 except that the pressure of the uniaxial press molding was set to 19.6 MPa, and was regarded as a green body of the present example.

A calcined body and a sintered body were obtained through the same method as in Example 1 except that the green body was used.

The warp was less than a measurement limit (less than 0.03 mm) for the green body, 0.03 mm for the calcined body, and 0.05 mm for the sintered body, and the deformation amount was 0.07 for the calcined body and 0.14 for the sintered body.

The density was 3.25 g/cm$^3$ for the green body, 3.19 g/cm$^3$ for the calcined body, and 6.06 g/cm$^3$ for the sintered body.

Example 12

A layered body was obtained through the same method as in Example 10 except that the pressure of the uniaxial press molding was set to 98 MPa, and was regarded as a green body of the present example.

A calcined body and a sintered body were obtained through the same method as in Example 1 except that the green body was used.

The warp was less than a measurement limit (less than 0.03 mm) for all of the green body, the calcined body, and the sintered body.

The density was 3.35 g/cm$^3$ for the green body, 3.29 g/cm$^3$ for the calcined body, and 6.06 g/cm$^3$ for the sintered body.

It can be seen from Examples 10 to 12 that the densities of the green body and the calcined body tend to improve due to an increase in the pressure of the uniaxial press molding. At the same time, it can be seen that the warps in the cases of the calcined body and the sintered body tend to be suppressed.

Example 13

A layered body was obtained through the same method as in Example 10 except that a mold having an inner diameter of 110 mm was used and the pressure of the uniaxial press molding was set to 98 MPa, and was regarded as a green body of the present example.

A calcined body and a sintered body were obtained through the same method as in Example 1 except that the green body was used.

The warp was less than a measurement limit (less than 0.03 mm) for all of the green body, the calcined body, and the sintered body.

It can be seen from Examples 12 and 13 that there is no difference in the warp (more precisely, the deformation amount) among the green body, the calcined body, and the sintered body due to the difference in the dimensions of the layered bodies.

The sintered bodies obtained in any of the examples had a change in the translucency between the uppermost layer and the lowermost layer and exhibited a texture close to that of natural teeth.

Example 14

A layered body was obtained through the same method as in Example 1 except that a mold having an inner diameter of 110 mm was used, the pressure of the uniaxial press molding was set to 19.6 MPa, and the zirconia powder C4 was used instead of the zirconia powder B1, and was regarded as a green body of the present example. The stabilizer content of the first powder layer was 5.5 mol % and the stabilizer content of the second powder layer was 4.0 mol %. The difference in the yttria content between the layers was 1.5 mol %, and the difference in the binder content was 0.4 wt %.

A calcined body and a sintered body were obtained through the same method as in Example 1 except that the green body was used. The stabilizer content of the sintered body was 4.75 mol %.

The warp was 0.05 mm for the green body, 0.11 mm for the calcined body, and less than a measurement limit (less than 0.03 mm) for the sintered body, and the deformation amount was 0.05 for the green body and 0.11 for the calcined body.

Example 15

A layered body was obtained through the same method as in Example 1 except that a mold having an inner diameter of 110 mm was used, the pressure of the uniaxial press molding was set to 19.6 MPa, and the zirconia powder C5 was used instead of the zirconia powder B1, and was regarded as a green body of the present example. The stabilizer content of the first powder layer was 5.5 mol % and the stabilizer content of the second powder layer was 4.0 mol %. The difference in the yttria content between the layers was 1.5 mol %, and the difference in the binder content was 0.37 wt %.

A calcined body and a sintered body were obtained through the same method as in Example 1 except that the green body was used. The stabilizer content of the sintered body was 4.75 mol %.

The warp was 0.05 mm for the green body, 0.14 mm for the calcined body, and less than a measurement limit (less than 0.03 mm) for the sintered body, and the deformation amount was 0.05 for the green body and 0.11 for the calcined body.

Example 16

A layered body was obtained through the same method as in Example 1 except that a mold having an inner diameter of 110 mm was used, the pressure of the uniaxial press molding was set to 19.6 MPa, and the zirconia powder C6 was used instead of the zirconia powder B1, and was regarded as a green body of the present example. The stabilizer content of the first powder layer was 5.5 mol % and the stabilizer content of the second powder layer was 4.0 mol %. The difference in the yttria content between the layers was 1.5 mol %, and the difference in the binder content was 0.4 wt %.

A calcined body and a sintered body were obtained through the same method as in Example 1 except that the green body was used. The stabilizer content of the sintered body was 4.75 mol %.

The warp was 0.05 mm for the green body, 0.15 mm for the calcined body, and less than a measurement limit (less than 0.03 mm) for the sintered body, and the deformation amount was 0.05 for the green body and 0.15 for the calcined body.

From Examples 14 to 16, there was no change in the size of the warps of the green body and the sintered body while the warp of the calcined body became smaller as the alumina content of a layer having a low stabilizer content decreased.

Example 17

A layered body was obtained through the same method as in Example 1 except that a mold having an inner diameter of 110 mm was used, the pressure of the uniaxial press molding was set to 98 MPa, and the zirconia powder A7 and C5 was used instead of the zirconia powder A1 and B1, and was regarded as a green body of the present example. The stabilizer content of the first powder layer was 5.8 mol % and the stabilizer content of the second powder layer was 4.0 mol %. The difference in the yttria content between the layers was 1.8 mol %, and the difference in the binder content was 0.42 wt %.

A calcined body and a sintered body were obtained through the same method as in Example 1 except that the green body was used. The stabilizer content of the sintered body was 4.9 mol %.

The warp was 0.04 mm for the calcined body and less than a measurement limit (less than 0.03 mm) for the green body and the sintered body, and the deformation amount was 0.03 for the calcined body.

Example 18

A layered body was obtained through the same method as in Example 1 except that a mold having an inner diameter of 110 mm was used, the pressure of the uniaxial press molding was set to 98 MPa, and the zirconia powder A6 and C5 was used instead of the zirconia powder A1 and B1, and was regarded as a green body of the present example. The stabilizer content of the first powder layer was 5.2 mol % and the stabilizer content of the second powder layer was 4.0 mol %. The difference in the yttria content between the layers was 1.2 mol %, and the difference in the binder content was 0.45 wt %.

A calcined body and a sintered body were obtained through the same method as in Example 1 except that the green body was used. The stabilizer content of the sintered body was 4.6 mol %.

The warp was less than a measurement limit (less than 0.03 mm) for all of the green body, the calcined body, and the sintered body.

Comparative Example 1

A mold having an inner diameter of 110 mm was filled with 25 g of zirconia powder consisting of 4.25 mol % yttria-containing zirconia, and was then tapped to form a first powder layer. The mold was filled with the same amount of zirconia powder consisting of 4.25 mol % yttria-containing zirconia on the first powder layer and tapped to form a second powder layer. Then, uniaxial press molding was performed at a pressure of 98 MPa. Thereafter, CIP processing was performed at a pressure of 196 MPa to obtain a layered body consisting of two layers, and the obtained layered body was regarded as a green body of the present comparative example. The difference in the yttria content between the layers was 0 mol % and the difference in the amount of the binding agent between the layers was 0 wt %.

A calcined body and a sintered body were produced through the same method as in Example 1 except that the green body was used. The warp was less than a measurement limit (<0.03 mm) for all the cases.

There was no warp generated in the calcined body of the present comparative example in which the first layer and the second layer have the same yttria content as each other. In addition, the obtained sintered body did not have a change in the translucency.

Comparative Example 2

A mold having an inner diameter of 110 mm was filled with 25 g of zirconia powder consisting of 0.094 wt % of iron oxide, 0.0045 wt % of cobalt oxide, and the balance being 4 mol % yttria-containing zirconia, and was then tapped to form a first powder layer. The mold was filled with the same amount of zirconia powder consisting of 4 mol % yttria-containing zirconia on the first powder layer and tapped to form a second powder layer. Then, uniaxial press molding was performed at a pressure of 98 MPa. Thereafter, CIP processing was performed at a pressure of 196 MPa to obtain a layered body consisting of two layers, and the obtained layered body was regarded as a green body of the present comparative example. The difference in the yttria content between the layers was 0 mol % and the difference in the amount of the binding agent between the layers was 0.02 wt %.

A calcined body was produced through the same method as in Example 1 except that the green body was used. The warp of the calcined body was 0.67 mm.

There was a large warp generated in the calcined body of the present comparative example in which the first layer and the second layer have the same yttria content as each other and have different color pigment contents by 0.139 wt %.

Reference Example 1

The mold having an inner diameter of 48 mm was filled with the zirconia powder A1 and tapped. Then, uniaxial press molding was performed at a pressure of 49 MPa. Thereafter, CIP processing was performed at a pressure of 196 MPa to obtain a green body.

A calcined body and a sintered body were obtained through the same method as in Example 1 except that the green body was used.

The obtained sintered body contained 0.05 wt % of alumina and the balance being 5.5 mol % yttria-containing zirconia. The crystal phase of the sintered body consisted of a tetragonal crystal and a cubic crystal while the cubic crystal was a main phase. In addition, the total light transmittance of the sintered body was 37.5% and the three-point bending strength was 600 MPa.

Reference Example 2

The mold having an inner diameter of 48 mm was filled with the zirconia powder B1 and tapped. Then, uniaxial press molding was performed at a pressure of 49 MPa. Thereafter, CIP processing was performed at a pressure of 196 MPa to obtain a green body.

A calcined body and a sintered body were obtained through the same method as in Example 1 except that the green body was used.

The obtained sintered body contained 0.05 wt % of alumina and the balance being 4.0 mol % yttria-containing zirconia. The crystal phase of the sintered body consisted of a tetragonal crystal and a cubic crystal while the tetragonal crystal was a main phase. In addition, the total light transmittance of the sintered body was 36% and the three-point bending strength was 1,100 MPa.

Reference Example 3

The mold having an inner diameter of 48 mm was filled with the zirconia powder B4 and tapped. Then, uniaxial press molding was performed at a pressure of 49 MPa. Thereafter, CIP processing was performed at a pressure of 196 MPa to obtain a green body.

A calcined body and a sintered body were obtained through the same method as in Example 1 except that the green body was used.

The obtained sintered body contained 0.05 wt % of alumina and the balance being 4.5 mol % yttria-containing zirconia. The total light transmittance of the sintered body was 37%.

The entire contents of the specifications, claims, drawings, and abstracts of Japanese Patent Application Nos. 2019-038234 and 2019-038235, filed Mar. 4, 2019 are incorporated by reference as a disclosure of the specification of the present disclosure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

100, 200, 300, 400: zirconia sintered body
11, 21: first layer
12, 22: second layer
23: third layer
32A, 32B: thickness gauge
33: size of sintered body
41: load
42: fulcrum points distance
51: zirconia having necking structure.

What is claimed is:

1. A layered body having a structure in which two or more layers containing zirconia containing a stabilizer are layered, the layered body comprising at least:
   a first layer containing zirconia having a stabilizer content of higher than or equal to 4 mol %; and
   a second layer containing zirconia having a stabilizer content different from that of the zirconia contained in the first layer,
   wherein a difference between the stabilizer content in the first layer and the stabilizer content in the second layer is greater than or equal to 0.5 mol %,
   wherein at least the first layer and the second layer contains one or more elements having a function of coloring zirconia,
   wherein at least the first layer and the second layer contain an element having a function of coloring zirconia and the content and the type of the element having a function of coloring zirconia in the first layer is different from the element having a function of coloring zirconia in the second layer and
   the layered body is a calcined body.

2. The layered body according to claim 1, wherein the elements are one or more selected from the group consisting of iron (Fe), cobalt (Co), nickel (Ni), manganese (Mn), praseodymium (Pr), neodymium (Nd), europium (Eu), gadolinium (Gd), terbium (Tb), erbium (Er), and ytterbium (Yb).

3. The layered body according to claim 1, wherein the content of the stabilizer of the stabilizer-containing zirconia contained in the second layer is 1.5 mol % to 7.0 mol %.

4. The layered body according to claim 1, wherein the content of the stabilizer of the stabilizer-containing zirconia contained in the second layer is 5.0 mol % to 7.0 mol %.

5. The layered body according to claim 1, wherein the content of the stabilizer of the stabilizer-containing zirconia contained in the first layer is 4.0 mol % to 6.0 mol %.

6. The layered body according to claim 1, wherein the stabilizer of the first and/or second layer is one or more selected from the group consisting of yttria ($Y_2O_3$), calcia (CaO), magnesia (MgO), and ceria ($CeO_2$).

7. The layered body according to claim 1, wherein at least one of the layers contains alumina.

8. The layered body according to claim 1, wherein a warp measured using a thickness gauge according to JIS B 7524:2008 is less than or equal to 1.0 mm.

9. The layered body according to claim 1, wherein a warp measured using a thickness gauge according to JIS B 7524:2008 is less than or equal to 0.2 mm.

10. The layered body according to claim 1, wherein a density is 2.4 g/cm$^3$ to 3.7 g/cm$^3$.

11. A method for producing the layered body according to claim 1, comprising:
   calcining a green body at 800° C. to 1,200° C.,
   wherein the green body has a structure, in which two or more powder composition layers consisting of a powder composition containing stabilizer-containing zirconia and a binding agent are layered, includes at least
      a first powder composition layer containing a binding agent and zirconia which has a stabilizer content of higher than or equal to 4 mol % and
      a second powder composition layer containing a binding agent and zirconia which has a stabilizer content different from that of the zirconia contained in the first powder composition layer, and contains one or more elements having a function of coloring zirconia, and
   has a difference in a binder content between the first powder composition layer and the second powder composition layer which exceeds 0.01 wt %.

12. A method for producing the layered body according to claim 1 comprising:
   calcining a green body at a temperature of higher than or equal to 900° C. and lower than 1,150° C.,
   wherein the green body has a structure, in which two or more powder composition layers consisting of a powder composition containing stabilizer-containing zirconia and a binding agent are layered, includes at least
      a first powder composition layer containing a binding agent and zirconia which has a stabilizer content of higher than or equal to 4 mol % and
      a second powder composition layer containing a binding agent and zirconia which has a stabilizer content different from that of the zirconia contained in the first powder composition layer, and contains one or more elements having a function of coloring zirconia, and
   has a difference in a binding agent content between the first powder composition layer and the second powder composition layer which exceeds 0.01 wt %.

13. The production method according to claim 12, wherein a warp of the green body measured using a thickness gauge according to JIS B 7524:2008 is less than or equal to 1.0 mm.

14. The production method according to claim 12, wherein the binding agent is one or more selected from the group consisting of polyvinyl alcohol, polyvinyl butyrate, wax, and acrylic resin.

15. The production method according to claim 12, wherein the powder composition contained in the powder composition layers is granulated powder.

16. The production method according to claim 12, wherein a density of the green body is 2.4 g/cm3 to 3.7 g/cm$^3$.

17. A dental material containing the layered body according to claim 1.

18. A method for producing a sintered body, the method including sintering the calcined body according to claim 1 at 1,200° C. to 1,600° C.

19. The layered body according to claim 1, wherein the elements having a function of coloring zirconia are at least any of an oxide or an element doped in zirconia.

* * * * *